US012492398B2

(12) United States Patent
Yang et al.

(10) Patent No.: US 12,492,398 B2
(45) Date of Patent: Dec. 9, 2025

(54) COMPOSITIONS FOR THE MULTIPLEXED DETECTION OF VIRUSES

(71) Applicants: Zunyi Yang, Gainesville, FL (US); Steven A Benner, Gainesville, FL (US)

(72) Inventors: Zunyi Yang, Gainesville, FL (US); Steven A Benner, Gainesville, FL (US)

( * ) Notice: Subject to any disclaimer, the term of this patent is extended or adjusted under 35 U.S.C. 154(b) by 501 days.

(21) Appl. No.: 17/101,467

(22) Filed: Nov. 23, 2020

(65) Prior Publication Data

US 2022/0162600 A1 May 26, 2022

(51) Int. Cl.
| | | |
|---|---|---|
| *C12Q 1/68* | (2018.01) | |
| *C12N 9/12* | (2006.01) | |
| *C12N 15/10* | (2006.01) | |
| *C12N 15/113* | (2010.01) | |
| *C12Q 1/6853* | (2018.01) | |
| *C12Q 1/686* | (2018.01) | |

(52) U.S. Cl.
CPC .......... *C12N 15/113* (2013.01); *C12N 9/1247* (2013.01); *C12Q 1/6853* (2013.01); *C12Q 1/686* (2013.01)

(58) Field of Classification Search
CPC .............................. C12N 15/113; C12N 9/1247
See application file for complete search history.

(56) References Cited

U.S. PATENT DOCUMENTS

| | | | | |
|---|---|---|---|---|
| 8,153,361 B1 * | 4/2012 | Benner | ................... | C12P 19/34 |
| | | | | 435/6.12 |
| 10,106,837 B1 * | 10/2018 | Benner | ................ | C12Q 1/6844 |
| 10,370,706 B1 * | 8/2019 | Hoshika | ................. | C12N 15/11 |
| 10,815,539 B1 * | 10/2020 | Brambati | ................. | C12Q 1/48 |
| 10,829,511 B1 * | 11/2020 | Benner | ................. | C07H 21/04 |
| 2021/0355551 A1 * | 11/2021 | Srivastava | ............... | C12Q 1/70 |
| 2021/0371941 A1 * | 12/2021 | Dimsoski | ............... | C12Q 1/701 |

FOREIGN PATENT DOCUMENTS

| | | | | |
|---|---|---|---|---|
| CN | 111286558 A | * | 6/2020 | |
| WO | WO-2010021702 A1 | * | 2/2010 | ............. C07H 21/04 |
| WO | WO-2015026609 A1 | * | 2/2015 | .............. C12P 19/34 |
| WO | WO-2020257356 A2 | * | 12/2020 | ............ B01L 3/5023 |
| WO | WO-2021240208 A1 | * | 12/2021 | |
| WO | WO-2022109359 A1 | * | 5/2022 | ........... C12N 15/113 |
| WO | WO-2022261044 A2 | * | 12/2022 | |

OTHER PUBLICATIONS

Yang et al., 2010. Expanded genetic alphabets in the polymerase chain reaction. Angewandte Chemie International Edition, 49(1), pp. 177-180. (Year: 2010).*
Yang et al., 2020. Eliminating primer dimers and improving SNP detection using self-avoiding molecular recognition systems. Biology Methods and Protocols, 5(1), pp. 1-13. (Year: 2020).*
English translation document of CN111286558A, published Jun. 16, 2020 (Year: 2020).*

* cited by examiner

Primary Examiner — Gary Benzion
Assistant Examiner — Olayinka A Oyeyemi

(57) ABSTRACT

This specification discloses compositions of matter and processes that allow the detection of RNA from coronaviruses and other RNA viruses, in particular, compositions and processes that have the capacity to detect in multiplexed form many RNA targets within individual viruses, targets from multiple viruses, and other RNA molecules that can be used as positive controls.

10 Claims, 7 Drawing Sheets

Figure 1:
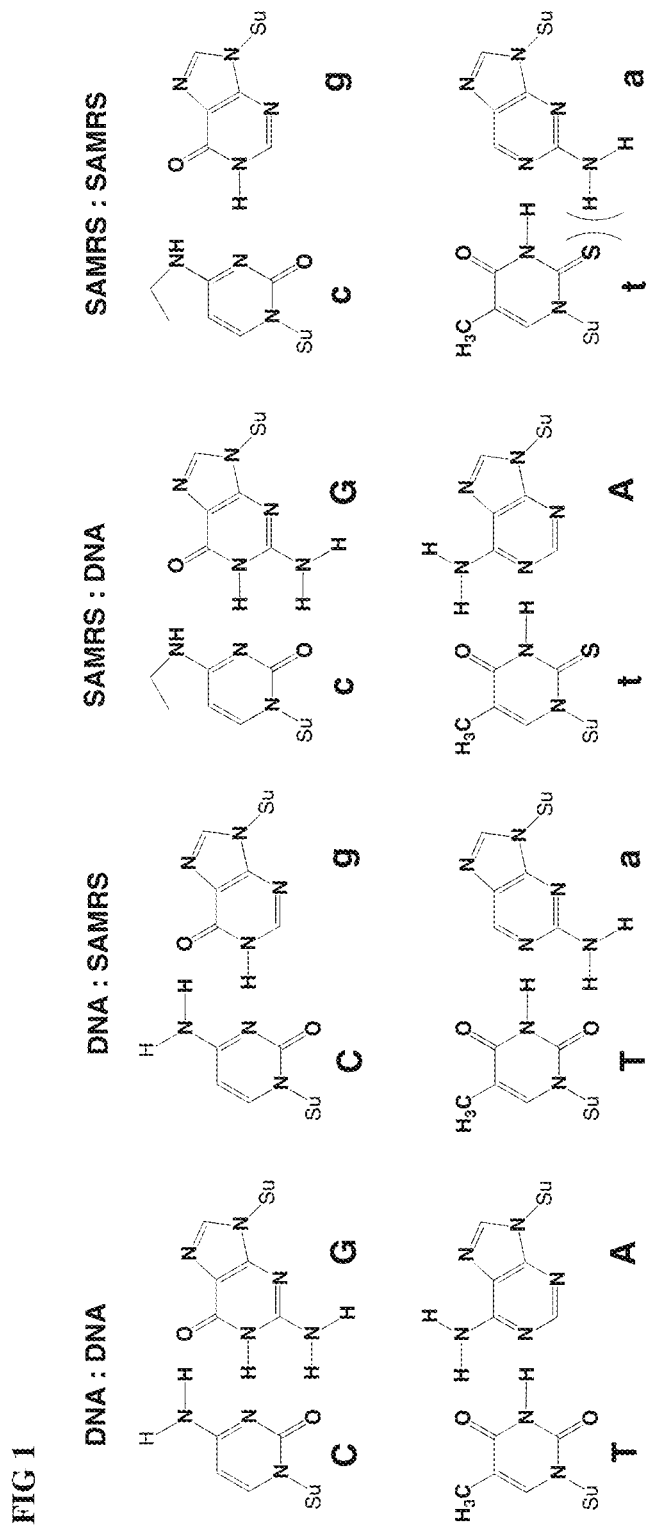

Specification includes a Sequence Listing.

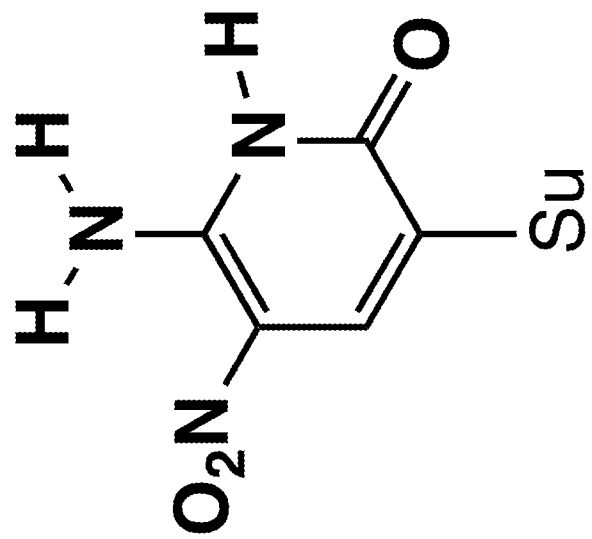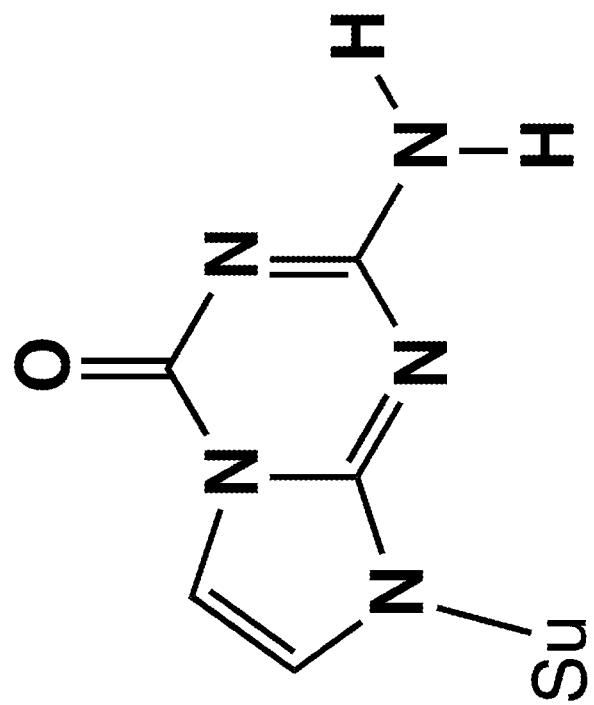
FIG 2

FIG 3

E_Sarbeco_Fp (top) / E_Sarbeco_Fp (bottom):
ACAGGTACGTTAATAGTTAATAGCGT – 3'
||| ||| ||| ||| ||| |||
TGTCCATGCAATTATCAATTATCGCA – 5'

E_Sarbeco_Rp (top) / RdRp_SARSr-Rp (bottom):
ATATTGCAGCAGTACGCACACA – 3'
||| ||| ||| ||| |||
GGCGGTGTGTACTGGTARAGTG – 5'

N1-Probe (top) / N1-Rp (bottom):
ACCCCGCATTACGTTTGGTGGACC – 3'
||| ||| ||| ||| |||
AAAACCACATAAGTTCCGAGGG – 5'

N2-Fp (top) / N2-Rp (bottom):
TTACAAACATTGGCCGCAAA – 3'
||| ||| ||| |||
AAAACCCCGGTTACAAACATT – 5'

N2-Fp (top) / N2-Probe (bottom):
TTACAAACATTGGCCGCAAA – 3'
||| ||| ||| ||| |||
AAACCCCGGTTACAAACATT – 5'

N2-Rp (top) / N3-Rp (bottom):
TTACAAACATTGGCCGCAAA – 3'
||| ||| ||| |||
GTTAAC-GACGTTAGCACGATGT – 5'

SEQUENCE LISTING

```
<160> NUMBER OF SEQ ID NOS: 150

<210> SEQ ID NO 1
<211> LENGTH: 20
<212> TYPE: DNA
<213> ORGANISM: Artificial Sequence
<220> FEATURE:
<223> OTHER INFORMATION: synthetic

<400> SEQUENCE: 1
gaccccaaaa tcagcgaaat                                                  20

<210> SEQ ID NO 2
<211> LENGTH: 24
<212> TYPE: DNA
<213> ORGANISM: Artificial Sequence
<220> FEATURE:
<223> OTHER INFORMATION: synthetic

<400> SEQUENCE: 2
```
tctggttact gccagttgaa tctg                                              24

<210> SEQ ID NO 3
<211> LENGTH: 24
<212> TYPE: DNA
<213> ORGANISM: Artificial Sequence
<220> FEATURE:
<223> OTHER INFORMATION: synthetic

<400> SEQUENCE: 3
accccgcatt acgtttggtg gacc                                              24

<210> SEQ ID NO 4
<211> LENGTH: 20
<212> TYPE: DNA
<213> ORGANISM: Artificial Sequence
<220> FEATURE:
<223> OTHER INFORMATION: synthetic

<400> SEQUENCE: 4
ttacaaacat tggccgcaaa                                                   20

<210> SEQ ID NO 5
<211> LENGTH: 18
<212> TYPE: DNA
<213> ORGANISM: Artificial Sequence
<220> FEATURE:
<223> OTHER INFORMATION: synthetic

<400> SEQUENCE: 5
gcgcgacatt ccgaagaa                                                     18

<210> SEQ ID NO 6
<211> LENGTH: 23
<212> TYPE: DNA
<213> ORGANISM: Artificial Sequence
<220> FEATURE:
<223> OTHER INFORMATION: synthetic

<400> SEQUENCE: 6
acaatttgcc cccagcgctt cag                                               23

<210> SEQ ID NO 7
<211> LENGTH: 22
<212> TYPE: DNA
<213> ORGANISM: Artificial Sequence
<220> FEATURE:
<223> OTHER INFORMATION: synthetic

<400> SEQUENCE: 7
gggagccttg aataccacaa aa                                                22

<210> SEQ ID NO 8
<211> LENGTH: 21
<212> TYPE: DNA
<213> ORGANISM: Artificial Sequence
<220> FEATURE:
<223> OTHER INFORMATION: synthetic

<400> SEQUENCE: 8
tgtagcacga ttgcagcatt g                                                 21

<210> SEQ ID NO 9
<211> LENGTH: 24
<212> TYPE: DNA

```
<213> ORGANISM: Artificial Sequence
<220> FEATURE:
<223> OTHER INFORMATION: synthetic

<400> SEQUENCE: 9
aycacattgg cacccgcaat cctg                                              24

<210> SEQ ID NO 10
<211> LENGTH: 19
<212> TYPE: DNA
<213> ORGANISM: Artificial Sequence
<220> FEATURE:
<223> OTHER INFORMATION: synthatic

<400> SEQUENCE: 10
agatttggac ctgcgagcg                                                    19

<210> SEQ ID NO 11
<211> LENGTH: 20
<212> TYPE: DNA
<213> ORGANISM: Artificial Sequence
<220> FEATURE:
<223> OTHER INFORMATION: synthetic

<400> SEQUENCE: 11
gagcggctgt ctccacaagt                                                   20

<210> SEQ ID NO 12
<211> LENGTH: 23
<212> TYPE: DNA
<213> ORGANISM: Artificial Sequence
<220> FEATURE:
<223> OTHER INFORMATION: synthetic

<400> SEQUENCE: 12
ttctgacctg aaggctctgc gcg                                               23

<210> SEQ ID NO 13
<211> LENGTH: 26
<212> TYPE: DNA
<213> ORGANISM: Artificial Sequence
<220> FEATURE:
<223> OTHER INFORMATION: synthetic

<400> SEQUENCE: 13
acaggtacgt taatagttaa tagcgt                                            26

<210> SEQ ID NO 14
<211> LENGTH: 22
<212> TYPE: DNA
<213> ORGANISM: Artificial Sequence
<220> FEATURE:
<223> OTHER INFORMATION: synthetic

<400> SEQUENCE: 14
atattgcagc agtacgcaca ca                                                22

<210> SEQ ID NO 15
<211> LENGTH: 26
<212> TYPE: DNA
<213> ORGANISM: Artificial Sequence
<220> FEATURE:
<223> OTHER INFORMATION: synthetic

<400> SEQUENCE: 15
acactagcca tccttactgc gcttcg                                            26
```

<210> SEQ ID NO 16
<211> LENGTH: 22
<212> TYPE: DNA
<213> ORGANISM: Artificial Sequence
<220> FEATURE:
<223> OTHER INFORMATION: synthetic

<400> SEQUENCE: 16
gtgaratggt catgtgtggc gg                                              22

<210> SEQ ID NO 17
<211> LENGTH: 26
<212> TYPE: DNA
<213> ORGANISM: Artificial Sequence
<220> FEATURE:
<223> OTHER INFORMATION: synthetic

<400> SEQUENCE: 17
caratgttaa asacactatt agcata                                          26

<210> SEQ ID NO 18
<211> LENGTH: 26
<212> TYPE: DNA
<213> ORGANISM: Artificial Sequence
<220> FEATURE:
<223> OTHER INFORMATION: synthetic

<400> SEQUENCE: 18
caratgttaa aaacactatt agcata                                          26

<210> SEQ ID NO 19
<211> LENGTH: 25
<212> TYPE: DNA
<213> ORGANISM: Artificial Sequence
<220> FEATURE:
<223> OTHER INFORMATION: synthetic

<400> SEQUENCE: 19
caggtggaac ctcatcagga gatgc                                           25

<210> SEQ ID NO 20
<211> LENGTH: 19
<212> TYPE: DNA
<213> ORGANISM: Artificial Sequence
<220> FEATURE:
<223> OTHER INFORMATION: synthetic

<400> SEQUENCE: 20
cacattggca cccgcaatc                                                  19

<210> SEQ ID NO 21
<211> LENGTH: 20
<212> TYPE: DNA
<213> ORGANISM: Artificial Sequence
<220> FEATURE:
<223> OTHER INFORMATION: synthetic

<400> SEQUENCE: 21
gaggaacgag aagaggcttg                                                 20

<210> SEQ ID NO 22
<211> LENGTH: 25
<212> TYPE: DNA
<213> ORGANISM: Artificial Sequence
<220> FEATURE:

<223> OTHER INFORMATION: synthetic

<400> SEQUENCE: 22
acttcctcaa ggaacaacat tgcca                                                25

<210> SEQ ID NO 23
<211> LENGTH: 21
<212> TYPE: DNA
<213> ORGANISM: Artificial Sequence
<220> FEATURE:
<223> OTHER INFORMATION: synthetic

<400> SEQUENCE: 23
ccctgtgggt tttacactta a                                                   21

<210> SEQ ID NO 24
<211> LENGTH: 19
<212> TYPE: DNA
<213> ORGANISM: Artificial Sequence
<220> FEATURE:
<223> OTHER INFORMATION: synthetic

<400> SEQUENCE: 24
acgattgtgc atcagctga                                                      19

<210> SEQ ID NO 25
<211> LENGTH: 28
<212> TYPE: DNA
<213> ORGANISM: Artificial Sequence
<220> FEATURE:
<223> OTHER INFORMATION: synthetic

<400> SEQUENCE: 25
ccgtctgcgg tatgtggaaa ggttatgg                                            28

<210> SEQ ID NO 26
<211> LENGTH: 22
<212> TYPE: DNA
<213> ORGANISM: Artificial Sequence
<220> FEATURE:
<223> OTHER INFORMATION: synthetic

<400> SEQUENCE: 26 gggggaacttc tcctgctaga at                                                 22

<210> SEQ ID NO 27
<211> LENGTH: 22
<212> TYPE: DNA
<213> ORGANISM: Artificial Sequence
<220> FEATURE:
<223> OTHER INFORMATION: synthetic

<400> SEQUENCE: 27
cagacatttt gctctcaagc tg                                                  22

<210> SEQ ID NO 28
<211> LENGTH: 20
<212> TYPE: DNA
<213> ORGANISM: Artificial Sequence
<220> FEATURE:
<223> OTHER INFORMATION: synthetic

<400> SEQUENCE: 28
ttgctgctgc ttgacagatt                                                     20

```
<210> SEQ ID NO 29
<211> LENGTH: 20
<212> TYPE: DNA
<213> ORGANISM: Artificial Sequence
<220> FEATURE:
<223> OTHER INFORMATION: synthetic

<400> SEQUENCE: 29
cgcatacagt cttrcaggct                                                   20

<210> SEQ ID NO 30
<211> LENGTH: 24
<212> TYPE: DNA
<213> ORGANISM: Artificial Sequence
<220> FEATURE:
<223> OTHER INFORMATION: synthetic

<400> SEQUENCE: 30
gtgtgatgtt gawatgacat ggtc                                              24

<210> SEQ ID NO 31
<211> LENGTH: 28
<212> TYPE: DNA
<213> ORGANISM: Artificial Sequence
<220> FEATURE:
<223> OTHER INFORMATION: synthetic

<400> SEQUENCE: 31
ttaagatgtg gtgcttgcat acgtagac                                          28

<210> SEQ ID NO 32
<211> LENGTH: 20
<212> TYPE: DNA
<213> ORGANISM: Artificial Sequence
<220> FEATURE:
<223> OTHER INFORMATION: synthetic

<400> SEQUENCE: 32
tggggyttta crggtaacct                                                   20

<210> SEQ ID NO 33
<211> LENGTH: 21
<212> TYPE: DNA
<213> ORGANISM: Artificial Sequence
<220> FEATURE:
<223> OTHER INFORMATION: synthetic

<400> SEQUENCE: 33
aacrcgctta acaaagcact c                                                 21

<210> SEQ ID NO 34
<211> LENGTH: 24
<212> TYPE: DNA
<213> ORGANISM: Artificial Sequence
<220> FEATURE:
<223> OTHER INFORMATION: synthetic

<400> SEQUENCE: 34
tagttgtgat gcwatcatga ctag                                              24

<210> SEQ ID NO 35
<211> LENGTH: 18
<212> TYPE: DNA
<213> ORGANISM: Artificial Sequence
<220> FEATURE:
<223> OTHER INFORMATION: synthetic
```

```
<400> SEQUENCE: 35
atgagcttag tcctgttg                                              18

<210> SEQ ID NO 36
<211> LENGTH: 18
<212> TYPE: DNA
<213> ORGANISM: Artificial Sequence
<220> FEATURE:
<223> OTHER INFORMATION: synthetic

<400> SEQUENCE: 36
ctccctttgt tgtgttgt                                              18

<210> SEQ ID NO 37
<211> LENGTH: 21
<212> TYPE: DNA
<213> ORGANISM: Artificial Sequence
<220> FEATURE:
<223> OTHER INFORMATION: synthetic

<400> SEQUENCE: 37
agatgtcttg tgctgccggt a                                          21

<210> SEQ ID NO 38
<211> LENGTH: 19
<212> TYPE: DNA
<213> ORGANISM: Artificial Sequence
<220> FEATURE:
<223> OTHER INFORMATION: synthetic

<400> SEQUENCE: 38
ggtaactggt atgatttcg                                             19

<210> SEQ ID NO 39
<211> LENGTH: 20
<212> TYPE: DNA
<213> ORGANISM: Artificial Sequence
<220> FEATURE:
<223> OTHER INFORMATION: synthetic

<400> SEQUENCE: 39
ctggtcaagg ttaatatagg                                            20

<210> SEQ ID NO 40
<211> LENGTH: 23
<212> TYPE: DNA
<213> ORGANISM: Artificial Sequence
<220> FEATURE:
<223> OTHER INFORMATION: synthetic

<400> SEQUENCE: 40
caatggtaac tggtatgatt tcg                                        23

<210> SEQ ID NO 41
<211> LENGTH: 23
<212> TYPE: DNA
<213> ORGANISM: Artificial Sequence
<220> FEATURE:
<223> OTHER INFORMATION: synthetic

<400> SEQUENCE: 41
gccctggtca aggttaatat agg                                        23

<210> SEQ ID NO 42
<211> LENGTH: 19
```

<212> TYPE: DNA
<213> ORGANISM: Artificial Sequence
<220> FEATURE:
<223> OTHER INFORMATION: synthetic

<400> SEQUENCE: 42
tcatacaaac cacgccagg                                                    19

<210> SEQ ID NO 43
<211> LENGTH: 20
<212> TYPE: DNA
<213> ORGANISM: Artificial Sequence
<220> FEATURE:
<223> OTHER INFORMATION: synthetic
<220> FEATURE:
<221> NAME/KEY: misc_feature
<222> LOCATION: (18)..(18)
<223> OTHER INFORMATION: 2 aminopurine

<400> SEQUENCE: 43
gaccccaaaa tcagcganat                                                   20

<210> SEQ ID NO 44
<211> LENGTH: 24
<212> TYPE: DNA
<213> ORGANISM: Artificial Sequence
<220> FEATURE:
<223> OTHER INFORMATION: synthetic
<220> FEATURE:
<221> NAME/KEY: misc_feature
<222> LOCATION: (22)..(22)
<223> OTHER INFORMATION: N ethylcytosine

<400> SEQUENCE: 44
tctggttact gccagttgaa tntg                                              24

<210> SEQ ID NO 45
<211> LENGTH: 20
<212> TYPE: DNA
<213> ORGANISM: Artificial Sequence
<220> FEATURE:
<223> OTHER INFORMATION: synthetic
<220> FEATURE:
<221> NAME/KEY: misc_feature
<222> LOCATION: (18)..(19)
<223> OTHER INFORMATION: 2 aminopurine

<400> SEQUENCE: 45
ttacaaacat tggccgcnna                                                   20

<210> SEQ ID NO 46
<211> LENGTH: 20
<212> TYPE: DNA
<213> ORGANISM: Artificial Sequence
<220> FEATURE:
<223> OTHER INFORMATION: synthetic
<220> FEATURE:
<221> NAME/KEY: misc_feature
<222> LOCATION: (19)..(19)
<223> OTHER INFORMATION: 2 aminopurine

<400> SEQUENCE: 46
ttacaaacat tggccgcana                                                   20

<210> SEQ ID NO 47
<211> LENGTH: 18
<212> TYPE: DNA
<213> ORGANISM: Artificial Sequence
<220> FEATURE:

```
<223> OTHER INFORMATION: synthetic
<220> FEATURE:
<221> NAME/KEY: misc_feature
<222> LOCATION: (17)..(17)
<223> OTHER INFORMATION: 2 aminopurine

<400> SEQUENCE: 47
gcgcgacatt ccgaagna                                                   18

<210> SEQ ID NO 48
<211> LENGTH: 22
<212> TYPE: DNA
<213> ORGANISM: Artificial Sequence
<220> FEATURE:
<223> OTHER INFORMATION: synthetic
<220> FEATURE:
<221> NAME/KEY: misc_feature
<222> LOCATION: (20)..(21)
<223> OTHER INFORMATION: 2 aminopurine

<400> SEQUENCE: 48
gggagccttg aatacaccan na                                              22

<210> SEQ ID NO 49
<211> LENGTH: 21
<212> TYPE: DNA
<213> ORGANISM: Artificial Sequence
<220> FEATURE:
<223> OTHER INFORMATION: synthetic
<220> FEATURE:
<221> NAME/KEY: misc_feature
<222> LOCATION: (18)..(18)
<223> OTHER INFORMATION: 2 aminopurine

<400> SEQUENCE: 49
tgtagcacga ttgcagcntt g                                               21

<210> SEQ ID NO 50
<211> LENGTH: 19
<212> TYPE: DNA
<213> ORGANISM: Artificial Sequence
<220> FEATURE:
<223> OTHER INFORMATION: synthetic
<220> FEATURE:
<221> NAME/KEY: misc_feature
<222> LOCATION: (18)..(18)
<223> OTHER INFORMATION: N ethylcytosine

<400> SEQUENCE: 50
agatttggac ctgcgagng                                                  19

<210> SEQ ID NO 51
<211> LENGTH: 20
<212> TYPE: DNA
<213> ORGANISM: Artificial Sequence
<220> FEATURE:
<223> OTHER INFORMATION: synthetic
<220> FEATURE:
<221> NAME/KEY: misc_feature
<222> LOCATION: (19)..(19)
<223> OTHER INFORMATION: inosine

<400> SEQUENCE: 51
gagcggctgt ctccacaant                                                 20

<210> SEQ ID NO 52
<211> LENGTH: 26
<212> TYPE: DNA
<213> ORGANISM: Artificial Sequence
```

```
<220> FEATURE:
<223> OTHER INFORMATION: synthetic
<220> FEATURE:
<221> NAME/KEY: misc_feature
<222> LOCATION: (24)..(24)
<223> OTHER INFORMATION: N ethylcytosine
<220> FEATURE:
<221> NAME/KEY: misc_feature
<222> LOCATION: (25)..(25)
<223> OTHER INFORMATION: inosine

<400> SEQUENCE: 52
acaggtacgt taatagttaa tagnnt                                              26

<210> SEQ ID NO 53
<211> LENGTH: 22
<212> TYPE: DNA
<213> ORGANISM: Artificial Sequence
<220> FEATURE:
<223> OTHER INFORMATION: synthetic
<220> FEATURE:
<221> NAME/KEY: misc_feature
<222> LOCATION: (21)..(21)
<223> OTHER INFORMATION: N ethylcytosine

<400> SEQUENCE: 53
atattgcagc agtacgcaca na                                                  22

<210> SEQ ID NO 54
<211> LENGTH: 22
<212> TYPE: DNA
<213> ORGANISM: Artificial Sequence
<220> FEATURE:
<223> OTHER INFORMATION: synthetic
<220> FEATURE:
<221> NAME/KEY: misc_feature
<222> LOCATION: (21)..(21)
<223> OTHER INFORMATION: inosine

<400> SEQUENCE: 54
gtgaratggt catgtgtggc ng                                                  22

<210> SEQ ID NO 55
<211> LENGTH: 26
<212> TYPE: DNA
<213> ORGANISM: Artificial Sequence
<220> FEATURE:
<223> OTHER INFORMATION: synthetic
<220> FEATURE:
<221> NAME/KEY: misc_feature
<222> LOCATION: (24)..(24)
<223> OTHER INFORMATION: 2 aminopurine

<400> SEQUENCE: 55
caratgttaa asacactatt agcnta                                              26

<210> SEQ ID NO 56
<211> LENGTH: 26
<212> TYPE: DNA
<213> ORGANISM: Artificial Sequence
<220> FEATURE:
<223> OTHER INFORMATION: synthetic
<220> FEATURE:
<221> NAME/KEY: misc_feature
<222> LOCATION: (24)..(24)
<223> OTHER INFORMATION: 2 aminopurine

<400> SEQUENCE: 56
caratgttaa aaacactatt agcnta                                              26
```

<210> SEQ ID NO 57
<211> LENGTH: 19
<212> TYPE: DNA
<213> ORGANISM: Artificial Sequence
<220> FEATURE:
<223> OTHER INFORMATION: synthetic
<220> FEATURE:
<221> NAME/KEY: misc_feature
<222> LOCATION: (17)..(17)
<223> OTHER INFORMATION: 2 aminopurine

<400> SEQUENCE: 57
cacattggca cccgcantc                                                19

<210> SEQ ID NO 58
<211> LENGTH: 20
<212> TYPE: DNA
<213> ORGANISM: Artificial Sequence
<220> FEATURE:
<223> OTHER INFORMATION: synthetic
<220> FEATURE:
<221> NAME/KEY: misc_feature
<222> LOCATION: (17)..(17)
<223> OTHER INFORMATION: N ethylcytosine

<400> SEQUENCE: 58
gaggaacgag aagaggnttg                                               20

<210> SEQ ID NO 59
<211> LENGTH: 21
<212> TYPE: DNA
<213> ORGANISM: Artificial Sequence
<220> FEATURE:
<223> OTHER INFORMATION: synthetic
<220> FEATURE:
<221> NAME/KEY: misc_feature
<222> LOCATION: (20)..(20)
<223> OTHER INFORMATION: 2 aminopurine

<400> SEQUENCE: 59
ccctgtgggt tttacacttn a                                             21

<210> SEQ ID NO 60
<211> LENGTH: 19
<212> TYPE: DNA
<213> ORGANISM: Artificial Sequence
<220> FEATURE:
<223> OTHER INFORMATION: synthetic
<220> FEATURE:
<221> NAME/KEY: misc_feature
<222> LOCATION: (18)..(18)
<223> OTHER INFORMATION: inosine

<400> SEQUENCE: 60
acgattgtgc atcagctna                                                19

<210> SEQ ID NO 61
<211> LENGTH: 22
<212> TYPE: DNA
<213> ORGANISM: Artificial Sequence
<220> FEATURE:
<223> OTHER INFORMATION: synthetic
<220> FEATURE:
<221> NAME/KEY: misc_feature
<222> LOCATION: (19)..(19)
<223> OTHER INFORMATION: inosine

<400> SEQUENCE: 61
ggggaacttc tcctgctana at                                            22

```
<210> SEQ ID NO 62
<211> LENGTH: 22
<212> TYPE: DNA
<213> ORGANISM: Artificial Sequence
<220> FEATURE:
<223> OTHER INFORMATION: synthetic
<220> FEATURE:
<221> NAME/KEY: misc_feature
<222> LOCATION: (20)..(20)
<223> OTHER INFORMATION: N ethylcytosine

<400> SEQUENCE: 62 cagacattttt gctctcaagn tg                                          22

<210> SEQ ID NO 63
<211> LENGTH: 20
<212> TYPE: DNA
<213> ORGANISM: Artificial Sequence
<220> FEATURE:
<223> OTHER INFORMATION: synthetic
<220> FEATURE:
<221> NAME/KEY: misc_feature
<222> LOCATION: (18)..(18)
<223> OTHER INFORMATION: inosine

<400> SEQUENCE: 63
cgcatacagt cttrcagnct                                              20

<210> SEQ ID NO 64
<211> LENGTH: 24
<212> TYPE: DNA
<213> ORGANISM: Artificial Sequence
<220> FEATURE:
<223> OTHER INFORMATION: synthetic
<220> FEATURE:
<221> NAME/KEY: misc_feature
<222> LOCATION: (22)..(22)
<223> OTHER INFORMATION: inosine

<400> SEQUENCE: 64
gtgtgatgtt gawatgacat gntc                                         24

<210> SEQ ID NO 65
<211> LENGTH: 20
<212> TYPE: DNA
<213> ORGANISM: Artificial Sequence
<220> FEATURE:
<223> OTHER INFORMATION: synthetic
<220> FEATURE:
<221> NAME/KEY: misc_feature
<222> LOCATION: (18)..(18)
<223> OTHER INFORMATION: N ethylcytosine

<400> SEQUENCE: 65
tggggyttta crggtaanct                                              20

<210> SEQ ID NO 66
<211> LENGTH: 21
<212> TYPE: DNA
<213> ORGANISM: Artificial Sequence
<220> FEATURE:
<223> OTHER INFORMATION: synthetic
<220> FEATURE:
<221> NAME/KEY: misc_feature
<222> LOCATION: (19)..(19)
<223> OTHER INFORMATION: N ethylcytosine

<400> SEQUENCE: 66
```
aacrcgctta acaaagcant c                                              21

<210> SEQ ID NO 67
<211> LENGTH: 18
<212> TYPE: DNA
<213> ORGANISM: Artificial Sequence
<220> FEATURE:
<223> OTHER INFORMATION: synthetic
<220> FEATURE:
<221> NAME/KEY: misc_feature
<222> LOCATION: (15)..(15)
<223> OTHER INFORMATION: inosine

<400> SEQUENCE: 67
atgagcttag tcctnttg                                                  18

<210> SEQ ID NO 68
<211> LENGTH: 18
<212> TYPE: DNA
<213> ORGANISM: Artificial Sequence
<220> FEATURE:
<223> OTHER INFORMATION: synthetic
<220> FEATURE:
<221> NAME/KEY: misc_feature
<222> LOCATION: (17)..(17)
<223> OTHER INFORMATION: inosine

<400> SEQUENCE: 68
ctccctttgt tgtgttnt                                                  18

<210> SEQ ID NO 69
<211> LENGTH: 19
<212> TYPE: DNA
<213> ORGANISM: Artificial Sequence
<220> FEATURE:
<223> OTHER INFORMATION: synthetic
<220> FEATURE:
<221> NAME/KEY: misc_feature
<222> LOCATION: (18)..(18)
<223> OTHER INFORMATION: N ethylcytosine

<400> SEQUENCE: 69
ggtaactggt atgatttng                                                 19

<210> SEQ ID NO 70
<211> LENGTH: 20
<212> TYPE: DNA
<213> ORGANISM: Artificial Sequence
<220> FEATURE:
<223> OTHER INFORMATION: synthetic
<220> FEATURE:
<221> NAME/KEY: misc_feature
<222> LOCATION: (18)..(18)
<223> OTHER INFORMATION: 2 aminopurine

<400> SEQUENCE: 70
ctggtcaagg ttaatatngg                                                20

<210> SEQ ID NO 71
<211> LENGTH: 23
<212> TYPE: DNA
<213> ORGANISM: Artificial Sequence
<220> FEATURE:
<223> OTHER INFORMATION: synthetic
<220> FEATURE:
<221> NAME/KEY: misc_feature
<222> LOCATION: (22)..(22)
<223> OTHER INFORMATION: N ethylcytosine

<400> SEQUENCE: 71

```
caatggtaac tggtatgatt tng                                      23
```

<210> SEQ ID NO 72
<211> LENGTH: 23
<212> TYPE: DNA
<213> ORGANISM: Artificial Sequence
<220> FEATURE:
<223> OTHER INFORMATION: synthetic
<220> FEATURE:
<221> NAME/KEY: misc_feature
<222> LOCATION: (21)..(21)
<223> OTHER INFORMATION: 2 aminopurine

<400> SEQUENCE: 72

```
gccctggtca aggttaatat ngg                                      23
```

<210> SEQ ID NO 73
<211> LENGTH: 31
<212> TYPE: DNA
<213> ORGANISM: Artificial Sequence
<220> FEATURE:
<223> OTHER INFORMATION: synthetic

<400> SEQUENCE: 73

```
ctcgaccgct agaccccaaa atcagcgaaa t                             31
```

<210> SEQ ID NO 74
<211> LENGTH: 35
<212> TYPE: DNA
<213> ORGANISM: Artificial Sequence
<220> FEATURE:
<223> OTHER INFORMATION: synthetic

<400> SEQUENCE: 74

```
ctcgaccgct atctggttac tgccagttga atctg                         35
```

<210> SEQ ID NO 75
<211> LENGTH: 31
<212> TYPE: DNA
<213> ORGANISM: Artificial Sequence
<220> FEATURE:
<223> OTHER INFORMATION: synthetic

<400> SEQUENCE: 75

```
ctcgaccgct attacaaaca ttggccgcaa a                             31
```

<210> SEQ ID NO 76
<211> LENGTH: 29
<212> TYPE: DNA
<213> ORGANISM: Artificial Sequence
<220> FEATURE:
<223> OTHER INFORMATION: synthetic

<400> SEQUENCE: 76

```
ctcgaccgct agcgcgacat tccgaagaa                                29
```

<210> SEQ ID NO 77
<211> LENGTH: 18
<212> TYPE: DNA
<213> ORGANISM: Artificial Sequence
<220> FEATURE:
<223> OTHER INFORMATION: synthetic

<400> SEQUENCE: 77

```
cgcgatcaaa acaacgtc                                            18
```

<210> SEQ ID NO 78
<211> LENGTH: 18
<212> TYPE: DNA
<213> ORGANISM: Artificial Sequence
<220> FEATURE:
<223> OTHER INFORMATION: synthetic

<400> SEQUENCE: 78
catctggact gctattgg                                                     18

<210> SEQ ID NO 79
<211> LENGTH: 29
<212> TYPE: DNA
<213> ORGANISM: Artificial Sequence
<220> FEATURE:
<223> OTHER INFORMATION: synthetic

<400> SEQUENCE: 79
ctcgaccgct acgcgatcaa aacaacgtc                                         29

<210> SEQ ID NO 80
<211> LENGTH: 29
<212> TYPE: DNA
<213> ORGANISM: Artificial Sequence
<220> FEATURE:
<223> OTHER INFORMATION: synthetic

<400> SEQUENCE: 80
ctcgaccgct acatctggac tgctattgg                                         29

<210> SEQ ID NO 81
<211> LENGTH: 20
<212> TYPE: DNA
<213> ORGANISM: Artificial Sequence
<220> FEATURE:
<223> OTHER INFORMATION: synthetic

<400> SEQUENCE: 81
atactgcgtc ttggttcacc                                                   20

<210> SEQ ID NO 82
<211> LENGTH: 19
<212> TYPE: DNA
<213> ORGANISM: Artificial Sequence
<220> FEATURE:
<223> OTHER INFORMATION: synthetic

<400> SEQUENCE: 82
gggtgtacct cttaatgcc                                                    19

<210> SEQ ID NO 83
<211> LENGTH: 20
<212> TYPE: DNA
<213> ORGANISM: Artificial Sequence
<220> FEATURE:
<223> OTHER INFORMATION: synthetic

<400> SEQUENCE: 83
gtccagttcc agtgtagtag                                                   20

<210> SEQ ID NO 84
<211> LENGTH: 18
<212> TYPE: DNA
<213> ORGANISM: Artificial Sequence
<220> FEATURE:
<223> OTHER INFORMATION: synthetic

<400> SEQUENCE: 84
cactgatgct ccttcaac                                                                                  18

<210> SEQ ID NO 85
<211> LENGTH: 21
<212> TYPE: DNA
<213> ORGANISM: Artificial Sequence
<220> FEATURE:
<223> OTHER INFORMATION: synthetic

<400> SEQUENCE: 85
agatgattga ctattgcctc c                                                                              21

<210> SEQ ID NO 86
<211> LENGTH: 18
<212> TYPE: DNA
<213> ORGANISM: Artificial Sequence
<220> FEATURE:
<223> OTHER INFORMATION: synthetic

<400> SEQUENCE: 86
cacttctcca ggtccatc                                                                                  18

<210> SEQ ID NO 87
<211> LENGTH: 20
<212> TYPE: DNA
<213> ORGANISM: Artificial Sequence
<220> FEATURE:
<223> OTHER INFORMATION: synthetic

<400> SEQUENCE: 87
cagcagcatc tttcttagtg                                                                                20

<210> SEQ ID NO 88
<211> LENGTH: 20
<212> TYPE: DNA
<213> ORGANISM: Artificial Sequence
<220> FEATURE:
<223> OTHER INFORMATION: synthetic

<400> SEQUENCE: 88
ccagatggta cttctattac                                                                                20

<210> SEQ ID NO 89
<211> LENGTH: 18
<212> TYPE: DNA
<213> ORGANISM: Artificial Sequence
<220> FEATURE:
<223> OTHER INFORMATION: synthetic

<400> SEQUENCE: 89
ttgcaaccca tacgatgc                                                                                  18

<210> SEQ ID NO 90
<211> LENGTH: 18
<212> TYPE: DNA
<213> ORGANISM: Artificial Sequence
<220> FEATURE:
<223> OTHER INFORMATION: synthetic

<400> SEQUENCE: 90
cgtcttggtt cacagctc                                                                                  18

<210> SEQ ID NO 91

```
<211> LENGTH: 18
<212> TYPE: DNA
<213> ORGANISM: Artificial Sequence
<220> FEATURE:
<223> OTHER INFORMATION: synthetic

<400> SEQUENCE: 91
tcatctggac cactattg                                                 18

<210> SEQ ID NO 92
<211> LENGTH: 20
<212> TYPE: DNA
<213> ORGANISM: Artificial Sequence
<220> FEATURE:
<223> OTHER INFORMATION: synthetic

<400> SEQUENCE: 92
cagtacaacg tcactcaagc                                               20

<210> SEQ ID NO 93
<211> LENGTH: 19
<212> TYPE: DNA
<213> ORGANISM: Artificial Sequence
<220> FEATURE:
<223> OTHER INFORMATION: synthetic

<400> SEQUENCE: 93
ccaaagaatg cagaggcac                                                19

<210> SEQ ID NO 94
<211> LENGTH: 31
<212> TYPE: DNA
<213> ORGANISM: Artificial Sequence
<220> FEATURE:
<223> OTHER INFORMATION: synthetic
<220> FEATURE:
<221> NAME/KEY: misc_feature
<222> LOCATION: (4)..(4)
<223> OTHER INFORMATION: 2-amino-8-(beta-D-2'-deoxyribofuranosyl)-
      imidazo-[1,2a]-1,3,5-triazin-[8H]-4-one
<220> FEATURE:
<221> NAME/KEY: misc_feature
<222> LOCATION: (8)..(8)
<223> OTHER INFORMATION: 2-amino-8-(beta-D-2'-deoxyribofuranosyl)-
      imidazo-[1,2a]-1,3,5-triazin-[8H]-4-one
<220> FEATURE:
<221> NAME/KEY: misc_feature
<222> LOCATION: (29)..(29)
<223> OTHER INFORMATION: 2 aminopurine

<400> SEQUENCE: 94
ctcnaccnct agaccccaaa atcagcgana t                                  31

<210> SEQ ID NO 95
<211> LENGTH: 35
<212> TYPE: DNA
<213> ORGANISM: Artificial Sequence
<220> FEATURE:
<223> OTHER INFORMATION: synthetic
<220> FEATURE:
<221> NAME/KEY: misc_feature
<222> LOCATION: (4)..(4)
<223> OTHER INFORMATION: 2-amino-8-(beta-D-2'-deoxyribofuranosyl)-
      imidazo-[1,2a]-1,3,5-triazin-[8H]-4-one
<220> FEATURE:
<221> NAME/KEY: misc_feature
<222> LOCATION: (8)..(8)
<223> OTHER INFORMATION: 2-amino-8-(beta-D-2'-deoxyribofuranosyl)-
      imidazo-[1,2a]-1,3,5-triazin-[8H]-4-one
<220> FEATURE:
<221> NAME/KEY: misc_feature
```

<222> LOCATION: (33)..(33)
<223> OTHER INFORMATION: N ethylcytosine

<400> SEQUENCE: 95
ctcnaccnct atctggttac tgccagttga atntg    35

<210> SEQ ID NO 96
<211> LENGTH: 31
<212> TYPE: DNA
<213> ORGANISM: Artificial Sequence
<220> FEATURE:
<223> OTHER INFORMATION: synthetic
<220> FEATURE:
<221> NAME/KEY: misc_feature
<222> LOCATION: (4)..(4)
<223> OTHER INFORMATION: 2-amino-8-(beta-D-2'-deoxyribofuranosyl)-
    imidazo-[1,2a]-1,3,5-triazin-[8H]-4-one
<220> FEATURE:
<221> NAME/KEY: misc_feature
<222> LOCATION: (8)..(8)
<223> OTHER INFORMATION: 2-amino-8-(beta-D-2'-deoxyribofuranosyl)-
    imidazo-[1,2a]-1,3,5-triazin-[8H]-4-one
<220> FEATURE:
<221> NAME/KEY: misc_feature
<222> LOCATION: (29)..(30)
<223> OTHER INFORMATION: 2 aminopurine

<400> SEQUENCE: 96
ctcnaccnct attacaaaca ttggccgcnn a    31

<210> SEQ ID NO 97
<211> LENGTH: 29
<212> TYPE: DNA
<213> ORGANISM: Artificial Sequence
<220> FEATURE:
<223> OTHER INFORMATION: synthetic
<220> FEATURE:
<221> NAME/KEY: misc_feature
<222> LOCATION: (4)..(4)
<223> OTHER INFORMATION: 2-amino-8-(beta-D-2'-deoxyribofuranosyl)-
    imidazo-[1,2a]-1,3,5-triazin-[8H]-4-one
<220> FEATURE:
<221> NAME/KEY: misc_feature
<222> LOCATION: (8)..(8)
<223> OTHER INFORMATION: 2-amino-8-(beta-D-2'-deoxyribofuranosyl)-
    imidazo-[1,2a]-1,3,5-triazin-[8H]-4-one
<220> FEATURE:
<221> NAME/KEY: misc_feature
<222> LOCATION: (28)..(28)
<223> OTHER INFORMATION: 2 aminopurine

<400> SEQUENCE: 97
ctcnaccnct agcgcgacat tccgaagna    29

<210> SEQ ID NO 98
<211> LENGTH: 18
<212> TYPE: DNA
<213> ORGANISM: Artificial Sequence
<220> FEATURE:
<223> OTHER INFORMATION: synthetic
<220> FEATURE:
<221> NAME/KEY: misc_feature
<222> LOCATION: (16)..(16)
<223> OTHER INFORMATION: inosine

<400> SEQUENCE: 98
cgcgatcaaa acaacntc    18

<210> SEQ ID NO 99
<211> LENGTH: 18
<212> TYPE: DNA

```
<213> ORGANISM: Artificial Sequence
<220> FEATURE:
<223> OTHER INFORMATION: synthetic
<220> FEATURE:
<221> NAME/KEY: misc_feature
<222> LOCATION: (17)..(17)
<223> OTHER INFORMATION: inosine

<400> SEQUENCE: 99
catctggact gctattng                                                        18

<210> SEQ ID NO 100
<211> LENGTH: 29
<212> TYPE: DNA
<213> ORGANISM: Artificial Sequence
<220> FEATURE:
<223> OTHER INFORMATION: synthetic
<220> FEATURE:
<221> NAME/KEY: misc_feature
<222> LOCATION: (4)..(4)
<223> OTHER INFORMATION: 2-amino-8-(beta-D-2'-deoxyribofuranosyl)-
      imidazo-[1,2a]-1,3,5-triazin-[8H]-4-one
<220> FEATURE:
<221> NAME/KEY: misc_feature
<222> LOCATION: (8)..(8)
<223> OTHER INFORMATION: 2-amino-8-(beta-D-2'-deoxyribofuranosyl)-
      imidazo-[1,2a]-1,3,5-triazin-[8H]-4-one
<220> FEATURE:
<221> NAME/KEY: misc_feature
<222> LOCATION: (27)..(27)
<223> OTHER INFORMATION: inosine

<400> SEQUENCE: 100
ctcnaccnct acgcgatcaa aacaacntc                                            29

<210> SEQ ID NO 101
<211> LENGTH: 29
<212> TYPE: DNA
<213> ORGANISM: Artificial Sequence
<220> FEATURE:
<223> OTHER INFORMATION: synthetic
<220> FEATURE:
<221> NAME/KEY: misc_feature
<222> LOCATION: (4)..(4)
<223> OTHER INFORMATION: 2-amino-8-(beta-D-2'-deoxyribofuranosyl)-
      imidazo-[1,2a]-1,3,5-triazin-[8H]-4-one
<220> FEATURE:
<221> NAME/KEY: misc_feature
<222> LOCATION: (8)..(8)
<223> OTHER INFORMATION: 2-amino-8-(beta-D-2'-deoxyribofuranosyl)-
      imidazo-[1,2a]-1,3,5-triazin-[8H]-4-one
<220> FEATURE:
<221> NAME/KEY: misc_feature
<222> LOCATION: (28)..(28)
<223> OTHER INFORMATION: inosine

<400> SEQUENCE: 101
ctcnaccnct acatctggac tgctattng                                            29

<210> SEQ ID NO 102
<211> LENGTH: 21
<212> TYPE: DNA
<213> ORGANISM: Artificial Sequence
<220> FEATURE:
<223> OTHER INFORMATION: synthetic
<220> FEATURE:
<221> NAME/KEY: misc_feature
<222> LOCATION: (1)..(1)
<223> OTHER INFORMATION: 2-amino-8-(beta-D-2'-deoxyribofuranosyl)-
      imidazo-[1,2a]-1,3,5-triazin-[8H]-4-one
<220> FEATURE:
<221> NAME/KEY: misc_feature
<222> LOCATION: (19)..(19)
```

<223> OTHER INFORMATION: 2 aminopurine

<400> SEQUENCE: 102
ngaccccaaa atcagcgana t                                              21

<210> SEQ ID NO 103
<211> LENGTH: 25
<212> TYPE: DNA
<213> ORGANISM: Artificial Sequence
<220> FEATURE:
<223> OTHER INFORMATION: synthetic
<220> FEATURE:
<221> NAME/KEY: misc_feature
<222> LOCATION: (1)..(1)
<223> OTHER INFORMATION: 2-amino-8-(beta-D-2'-deoxyribofuranosyl)-
      imidazo-[1,2a]-1,3,5-triazin-[8H]-4-one
<220> FEATURE:
<221> NAME/KEY: misc_feature
<222> LOCATION: (23)..(23)
<223> OTHER INFORMATION: N ethylcytosine

<400> SEQUENCE: 103
ntctggttac tgccagttga atntg                                          25

<210> SEQ ID NO 104
<211> LENGTH: 21
<212> TYPE: DNA
<213> ORGANISM: Artificial Sequence
<220> FEATURE:
<223> OTHER INFORMATION: synthetic
<220> FEATURE:
<221> NAME/KEY: misc_feature
<222> LOCATION: (1)..(1)
<223> OTHER INFORMATION: 2-amino-8-(beta-D-2'-deoxyribofuranosyl)-
      imidazo-[1,2a]-1,3,5-triazin-[8H]-4-one
<220> FEATURE:
<221> NAME/KEY: misc_feature
<222> LOCATION: (20)..(20)
<223> OTHER INFORMATION: 2 aminopurine

<400> SEQUENCE: 104
nttacaaaca ttggccgcan a                                              21

<210> SEQ ID NO 105
<211> LENGTH: 21
<212> TYPE: DNA
<213> ORGANISM: Artificial Sequence
<220> FEATURE:
<223> OTHER INFORMATION: synthetic
<220> FEATURE:
<221> NAME/KEY: misc_feature
<222> LOCATION: (1)..(1)
<223> OTHER INFORMATION: 2-amino-8-(beta-D-2'-deoxyribofuranosyl)-
      imidazo-[1,2a]-1,3,5-triazin-[8H]-4-one
<220> FEATURE:
<221> NAME/KEY: misc_feature
<222> LOCATION: (19)..(20)
<223> OTHER INFORMATION: 2 aminopurine

<400> SEQUENCE: 105
nttacaaaca ttggccgcnn a                                              21

<210> SEQ ID NO 106
<211> LENGTH: 19
<212> TYPE: DNA
<213> ORGANISM: Artificial Sequence
<220> FEATURE:
<223> OTHER INFORMATION: synthetic
<220> FEATURE:
<221> NAME/KEY: misc_feature
<222> LOCATION: (1)..(1)

```
<223> OTHER INFORMATION: 2-amino-8-(beta-D-2'-deoxyribofuranosyl)-
      imidazo-[1,2a]-1,3,5-triazin-[8H]-4-one
<220> FEATURE:
<221> NAME/KEY: misc_feature
<222> LOCATION: (18)..(18)
<223> OTHER INFORMATION: 2 aminopurine

<400> SEQUENCE: 106
ngcgcgacat tccgaagna                                                19

<210> SEQ ID NO 107
<211> LENGTH: 23
<212> TYPE: DNA
<213> ORGANISM: Artificial Sequence
<220> FEATURE:
<223> OTHER INFORMATION: synthetic
<220> FEATURE:
<221> NAME/KEY: misc_feature
<222> LOCATION: (1)..(1)
<223> OTHER INFORMATION: 2-amino-8-(beta-D-2'-deoxyribofuranosyl)-
      imidazo-[1,2a]-1,3,5-triazin-[8H]-4-one
<220> FEATURE:
<221> NAME/KEY: misc_feature
<222> LOCATION: (21)..(22)
<223> OTHER INFORMATION: 2 aminopurine

<400> SEQUENCE: 107
ngggagcctt gaatacacca nna                                           23

<210> SEQ ID NO 108
<211> LENGTH: 22
<212> TYPE: DNA
<213> ORGANISM: Artificial Sequence
<220> FEATURE:
<223> OTHER INFORMATION: synthetic
<220> FEATURE:
<221> NAME/KEY: misc_feature
<222> LOCATION: (1)..(1)
<223> OTHER INFORMATION: 2-amino-8-(beta-D-2'-deoxyribofuranosyl)-
      imidazo-[1,2a]-1,3,5-triazin-[8H]-4-one
<220> FEATURE:
<221> NAME/KEY: misc_feature
<222> LOCATION: (19)..(19)
<223> OTHER INFORMATION: 2 aminopurine

<400> SEQUENCE: 108
ntgtagcacg attgcagcnt tg                                            22

<210> SEQ ID NO 109
<211> LENGTH: 20
<212> TYPE: DNA
<213> ORGANISM: Artificial Sequence
<220> FEATURE:
<223> OTHER INFORMATION: synthetic
<220> FEATURE:
<221> NAME/KEY: misc_feature
<222> LOCATION: (1)..(1)
<223> OTHER INFORMATION: 2-amino-8-(beta-D-2'-deoxyribofuranosyl)-
      imidazo-[1,2a]-1,3,5-triazin-[8H]-4-one
<220> FEATURE:
<221> NAME/KEY: misc_feature
<222> LOCATION: (19)..(19)
<223> OTHER INFORMATION: N ethylcytosine

<400> SEQUENCE: 109
nagatttgga cctgcgagng                                               20

<210> SEQ ID NO 110
<211> LENGTH: 21
<212> TYPE: DNA
<213> ORGANISM: Artificial Sequence
```

<220> FEATURE:
<223> OTHER INFORMATION: synthetic
<220> FEATURE:
<221> NAME/KEY: misc_feature
<222> LOCATION: (1)..(1)
<223> OTHER INFORMATION: 2-amino-8-(beta-D-2'-deoxyribofuranosyl)-
      imidazo-[1,2a]-1,3,5-triazin-[8H]-4-one
<220> FEATURE:
<221> NAME/KEY: misc_feature
<222> LOCATION: (20)..(20)
<223> OTHER INFORMATION: inosine

<400> SEQUENCE: 110
ngagcggctg tctccacaan t                                           21

<210> SEQ ID NO 111
<211> LENGTH: 27
<212> TYPE: DNA
<213> ORGANISM: Artificial Sequence
<220> FEATURE:
<223> OTHER INFORMATION: synthetic
<220> FEATURE:
<221> NAME/KEY: misc_feature
<222> LOCATION: (1)..(1)
<223> OTHER INFORMATION: 2-amino-8-(beta-D-2'-deoxyribofuranosyl)-
      imidazo-[1,2a]-1,3,5-triazin-[8H]-4-one
<220> FEATURE:
<221> NAME/KEY: misc_feature
<222> LOCATION: (25)..(25)
<223> OTHER INFORMATION: N ethylcytosine
<220> FEATURE:
<221> NAME/KEY: misc_feature
<222> LOCATION: (26)..(26)
<223> OTHER INFORMATION: inosine

<400> SEQUENCE: 111
nacaggtacg ttaatagtta atagnnt                                     27

<210> SEQ ID NO 112
<211> LENGTH: 23
<212> TYPE: DNA
<213> ORGANISM: Artificial Sequence
<220> FEATURE:
<223> OTHER INFORMATION: synthetic
<220> FEATURE:
<221> NAME/KEY: misc_feature
<222> LOCATION: (1)..(1)
<223> OTHER INFORMATION: 2-amino-8-(beta-D-2'-deoxyribofuranosyl)-
      imidazo-[1,2a]-1,3,5-triazin-[8H]-4-one
<220> FEATURE:
<221> NAME/KEY: misc_feature
<222> LOCATION: (22)..(22)
<223> OTHER INFORMATION: N ethylcytosine

<400> SEQUENCE: 112
natattgcag cagtacgcac ana                                         23

<210> SEQ ID NO 113
<211> LENGTH: 21
<212> TYPE: DNA
<213> ORGANISM: Artificial Sequence
<220> FEATURE:
<223> OTHER INFORMATION: synthetic
<220> FEATURE:
<221> NAME/KEY: misc_feature
<222> LOCATION: (1)..(1)
<223> OTHER INFORMATION: 2-amino-8-(beta-D-2'-deoxyribofuranosyl)-
      imidazo-[1,2a]-1,3,5-triazin-[8H]-4-one
<220> FEATURE:
<221> NAME/KEY: misc_feature
<222> LOCATION: (19)..(19)
<223> OTHER INFORMATION: inosine

<400> SEQUENCE: 113
ncgcatacag tcttrcagnc t                                    21

<210> SEQ ID NO 114
<211> LENGTH: 25
<212> TYPE: DNA
<213> ORGANISM: Artificial Sequence
<220> FEATURE:
<223> OTHER INFORMATION: synthetic
<220> FEATURE:
<221> NAME/KEY: misc_feature
<222> LOCATION: (1)..(1)
<223> OTHER INFORMATION: 2-amino-8-(beta-D-2'-deoxyribofuranosyl)-
      imidazo-[1,2a]-1,3,5-triazin-[8H]-4-one
<220> FEATURE:
<221> NAME/KEY: misc_feature
<222> LOCATION: (23)..(23)
<223> OTHER INFORMATION: inosine

<400> SEQUENCE: 114
ngtgtgatgt tgawatgaca tgntc                                25

<210> SEQ ID NO 115
<211> LENGTH: 24
<212> TYPE: DNA
<213> ORGANISM: Artificial Sequence
<220> FEATURE:
<223> OTHER INFORMATION: synthetic
<220> FEATURE:
<221> NAME/KEY: misc_feature
<222> LOCATION: (1)..(1)
<223> OTHER INFORMATION: 2-amino-8-(beta-D-2'-deoxyribofuranosyl)-
      imidazo-[1,2a]-1,3,5-triazin-[8H]-4-one
<220> FEATURE:
<221> NAME/KEY: misc_feature
<222> LOCATION: (23)..(23)
<223> OTHER INFORMATION: N ethylcytosine

<400> SEQUENCE: 115
ncaatggtaa ctggtatgat ttng                                 24

<210> SEQ ID NO 116
<211> LENGTH: 24
<212> TYPE: DNA
<213> ORGANISM: Artificial Sequence
<220> FEATURE:
<223> OTHER INFORMATION: synthetic
<220> FEATURE:
<221> NAME/KEY: misc_feature
<222> LOCATION: (1)..(1)
<223> OTHER INFORMATION: 2-amino-8-(beta-D-2'-deoxyribofuranosyl)-
      imidazo-[1,2a]-1,3,5-triazin-[8H]-4-one
<220> FEATURE:
<221> NAME/KEY: misc_feature
<222> LOCATION: (22)..(22)
<223> OTHER INFORMATION: 2 aminopurine

<400> SEQUENCE: 116
ngccctggtc aaggttaata tngg                                 24

<210> SEQ ID NO 117
<211> LENGTH: 19
<212> TYPE: DNA
<213> ORGANISM: Artificial Sequence
<220> FEATURE:
<223> OTHER INFORMATION: synthetic
<220> FEATURE:
<221> NAME/KEY: misc_feature
<222> LOCATION: (18)..(18)
<223> OTHER INFORMATION: N ethylcytosine

```
<400> SEQUENCE: 117
gggtgtacct cttaatgnc                                                19

<210> SEQ ID NO 118
<211> LENGTH: 20
<212> TYPE: DNA
<213> ORGANISM: Artificial Sequence
<220> FEATURE:
<223> OTHER INFORMATION: synthetic
<220> FEATURE:
<221> NAME/KEY: misc_feature
<222> LOCATION: (17)..(17)
<223> OTHER INFORMATION: inosine
<220> FEATURE:
<221> NAME/KEY: misc_feature
<222> LOCATION: (19)..(19)
<223> OTHER INFORMATION: 2 aminopurine

<400> SEQUENCE: 118
gtccagttcc agtgtantng                                               20

<210> SEQ ID NO 119
<211> LENGTH: 18
<212> TYPE: DNA
<213> ORGANISM: Artificial Sequence
<220> FEATURE:
<223> OTHER INFORMATION: synthetic
<220> FEATURE:
<221> NAME/KEY: misc_feature
<222> LOCATION: (17)..(17)
<223> OTHER INFORMATION: 2 aminopurine

<400> SEQUENCE: 119
cactgatgct ccttcanc                                                 18

<210> SEQ ID NO 120
<211> LENGTH: 21
<212> TYPE: DNA
<213> ORGANISM: Artificial Sequence
<220> FEATURE:
<223> OTHER INFORMATION: synthetic
<220> FEATURE:
<221> NAME/KEY: misc_feature
<222> LOCATION: (18)..(18)
<223> OTHER INFORMATION: N ethylcytosine
<220> FEATURE:
<221> NAME/KEY: misc_feature
<222> LOCATION: (20)..(20)
<223> OTHER INFORMATION: N ethylcytosine

<400> SEQUENCE: 120
agatgattga ctattgcntn c                                             21

<210> SEQ ID NO 121
<211> LENGTH: 18
<212> TYPE: DNA
<213> ORGANISM: Artificial Sequence
<220> FEATURE:
<223> OTHER INFORMATION: synthetic
<220> FEATURE:
<221> NAME/KEY: misc_feature
<222> LOCATION: (15)..(15)
<223> OTHER INFORMATION: N ethylcytosine
<220> FEATURE:
<221> NAME/KEY: misc_feature
<222> LOCATION: (16)..(16)
<223> OTHER INFORMATION: 2 aminopurine

<400> SEQUENCE: 121
cacttctcca ggtcnntc                                                 18
```

<210> SEQ ID NO 122
<211> LENGTH: 20
<212> TYPE: DNA
<213> ORGANISM: Artificial Sequence
<220> FEATURE:
<223> OTHER INFORMATION: synthetic
<220> FEATURE:
<221> NAME/KEY: misc_feature
<222> LOCATION: (18)..(18)
<223> OTHER INFORMATION: inosine

<400> SEQUENCE: 122
cagcagcatc tttcttantg                                               20

<210> SEQ ID NO 123
<211> LENGTH: 20
<212> TYPE: DNA
<213> ORGANISM: Artificial Sequence
<220> FEATURE:
<223> OTHER INFORMATION: synthetic
<220> FEATURE:
<221> NAME/KEY: misc_feature
<222> LOCATION: (16)..(16)
<223> OTHER INFORMATION: 2 aminopurine

<400> SEQUENCE: 123
ccagatggta cttctnttac                                               20

<210> SEQ ID NO 124
<211> LENGTH: 18
<212> TYPE: DNA
<213> ORGANISM: Artificial Sequence
<220> FEATURE:
<223> OTHER INFORMATION: synthetic
<220> FEATURE:
<221> NAME/KEY: misc_feature
<222> LOCATION: (17)..(17)
<223> OTHER INFORMATION: inosine

<400> SEQUENCE: 124
ttgcaaccca tacgatnc                                                 18

<210> SEQ ID NO 125
<211> LENGTH: 18
<212> TYPE: DNA
<213> ORGANISM: Artificial Sequence
<220> FEATURE:
<223> OTHER INFORMATION: synthetic
<220> FEATURE:
<221> NAME/KEY: misc_feature
<222> LOCATION: (16)..(16)
<223> OTHER INFORMATION: N ethylcytosine

<400> SEQUENCE: 125
cgtcttggtt cacagntc                                                 18

<210> SEQ ID NO 126
<211> LENGTH: 18
<212> TYPE: DNA
<213> ORGANISM: Artificial Sequence
<220> FEATURE:
<223> OTHER INFORMATION: synthetic
<220> FEATURE:
<221> NAME/KEY: misc_feature
<222> LOCATION: (15)..(15)
<223> OTHER INFORMATION: 2 aminopurine

<400> SEQUENCE: 126
tcatctggac cactnttg                                                18

<210> SEQ ID NO 127
<211> LENGTH: 20
<212> TYPE: DNA
<213> ORGANISM: Artificial Sequence
<220> FEATURE:
<223> OTHER INFORMATION: synthetic
<220> FEATURE:
<221> NAME/KEY: misc_feature
<222> LOCATION: (18)..(18)
<223> OTHER INFORMATION: 2 aminopurine

<400> SEQUENCE: 127
cagtacaacg tcactcangc                                              20

<210> SEQ ID NO 128
<211> LENGTH: 19
<212> TYPE: DNA
<213> ORGANISM: Artificial Sequence
<220> FEATURE:
<223> OTHER INFORMATION: synthetic
<220> FEATURE:
<221> NAME/KEY: misc_feature
<222> LOCATION: (17)..(17)
<223> OTHER INFORMATION: N ethylcytosine
<220> FEATURE:
<221> NAME/KEY: misc_feature
<222> LOCATION: (18)..(18)
<223> OTHER INFORMATION: 2 aminopurine

<400> SEQUENCE: 128
ccaaagaatg cagaggnnc                                               19

<210> SEQ ID NO 129
<211> LENGTH: 25
<212> TYPE: DNA
<213> ORGANISM: Artificial Sequence
<220> FEATURE:
<223> OTHER INFORMATION: synthetic
<220> FEATURE:
<221> NAME/KEY: misc_feature
<222> LOCATION: (24)..(24)
<223> OTHER INFORMATION: 2 aminopurine

<400> SEQUENCE: 129
caagaccaat cytgtcacct ctgnc                                        25

<210> SEQ ID NO 130
<211> LENGTH: 25
<212> TYPE: DNA
<213> ORGANISM: Artificial Sequence
<220> FEATURE:
<223> OTHER INFORMATION: synthetic
<220> FEATURE:
<221> NAME/KEY: misc_feature
<222> LOCATION: (24)..(24)
<223> OTHER INFORMATION: 2 aminopurine

<400> SEQUENCE: 130
caagaccaat yctgtcacct ytgnc                                        25

<210> SEQ ID NO 131
<211> LENGTH: 23
<212> TYPE: DNA
<213> ORGANISM: Artificial Sequence
<220> FEATURE:
<223> OTHER INFORMATION: synthetic
<220> FEATURE:
<221> NAME/KEY: misc_feature

```
<222> LOCATION: (21)..(21)
<223> OTHER INFORMATION: 2 aminopurine

<400> SEQUENCE: 131
gcattytgga caaavcgtct ncg                                              23

<210> SEQ ID NO 132
<211> LENGTH: 23
<212> TYPE: DNA
<213> ORGANISM: Artificial Sequence
<220> FEATURE:
<223> OTHER INFORMATION: synthetic
<220> FEATURE:
<221> NAME/KEY: misc_feature
<222> LOCATION: (15)..(15)
<223> OTHER INFORMATION: inosine
<220> FEATURE:
<221> NAME/KEY: misc_feature
<222> LOCATION: (21)..(21)
<223> OTHER INFORMATION: 2 aminopurine

<400> SEQUENCE: 132
gcattytgga caaancgtct ncg                                              23

<210> SEQ ID NO 133
<211> LENGTH: 23
<212> TYPE: DNA
<213> ORGANISM: Artificial Sequence
<220> FEATURE:
<223> OTHER INFORMATION: synthetic
<220> FEATURE:
<221> NAME/KEY: misc_feature
<222> LOCATION: (21)..(21)
<223> OTHER INFORMATION: 2 aminopurine

<400> SEQUENCE: 133
gcattttgga yaaagcgtct ncg                                              23

<210> SEQ ID NO 134
<211> LENGTH: 21
<212> TYPE: DNA
<213> ORGANISM: Artificial Sequence
<220> FEATURE:
<223> OTHER INFORMATION: synthetic
<220> FEATURE:
<221> NAME/KEY: misc_feature
<222> LOCATION: (20)..(20)
<223> OTHER INFORMATION: N ethylcytosine

<400> SEQUENCE: 134
tcctcaaytc actcttcgan g                                                21

<210> SEQ ID NO 135
<211> LENGTH: 21
<212> TYPE: DNA
<213> ORGANISM: Artificial Sequence
<220> FEATURE:
<223> OTHER INFORMATION: synthetic
<220> FEATURE:
<221> NAME/KEY: misc_feature
<222> LOCATION: (20)..(20)
<223> OTHER INFORMATION: inosine

<400> SEQUENCE: 135
cggtgctctt gaccaaattn g                                                21

<210> SEQ ID NO 136
<211> LENGTH: 23
<212> TYPE: DNA
```

```
<213> ORGANISM: Artificial Sequence
<220> FEATURE:
<223> OTHER INFORMATION: synthetic
<220> FEATURE:
<221> NAME/KEY: misc_feature
<222> LOCATION: (21)..(21)
<223> OTHER INFORMATION: N ethylcytosine

<400> SEQUENCE: 136
cgtcttaatg tagcagaatt nac                                         23

<210> SEQ ID NO 137
<211> LENGTH: 23
<212> TYPE: DNA
<213> ORGANISM: Artificial Sequence
<220> FEATURE:
<223> OTHER INFORMATION: synthetic
<220> FEATURE:
<221> NAME/KEY: misc_feature
<222> LOCATION: (21)..(21)
<223> OTHER INFORMATION: 2 aminopurine

<400> SEQUENCE: 137
atcaatccca ttctaacaag ntc                                         23

<210> SEQ ID NO 138
<211> LENGTH: 20
<212> TYPE: DNA
<213> ORGANISM: Artificial Sequence
<220> FEATURE:
<223> OTHER INFORMATION: synthetic
<220> FEATURE:
<221> NAME/KEY: misc_feature
<222> LOCATION: (18)..(18)
<223> OTHER INFORMATION: 2 aminopurine

<400> SEQUENCE: 138
ggaaacatac gtgaacangc                                             20

<210> SEQ ID NO 139
<211> LENGTH: 20
<212> TYPE: DNA
<213> ORGANISM: Artificial Sequence
<220> FEATURE:
<223> OTHER INFORMATION: synthetic
<220> FEATURE:
<221> NAME/KEY: misc_feature
<222> LOCATION: (17)..(17)
<223> OTHER INFORMATION: inosine
<220> FEATURE:
<221> NAME/KEY: misc_feature
<222> LOCATION: (19)..(19)
<223> OTHER INFORMATION: 2 aminopurine

<400> SEQUENCE: 139
gatgactgga acatagncnc                                             20

<210> SEQ ID NO 140
<211> LENGTH: 26
<212> TYPE: DNA
<213> ORGANISM: Artificial Sequence
<220> FEATURE:
<223> OTHER INFORMATION: synthetic
<220> FEATURE:
<221> NAME/KEY: misc_feature
<222> LOCATION: (1)..(1)
<223> OTHER INFORMATION: 2-amino-8-(beta-D-2'-deoxyribofuranosyl)-
      imidazo-[1,2a]-1,3,5-triazin-[8H]-4-one
<220> FEATURE:
<221> NAME/KEY: misc_feature
<222> LOCATION: (25)..(25)
```

<223> OTHER INFORMATION: 2 aminopurine

<400> SEQUENCE: 140
ncaagaccaa tcytgtcacc tctgnc                                              26

<210> SEQ ID NO 141
<211> LENGTH: 26
<212> TYPE: DNA
<213> ORGANISM: Artificial Sequence
<220> FEATURE:
<223> OTHER INFORMATION: synthetic
<220> FEATURE:
<221> NAME/KEY: misc_feature
<222> LOCATION: (1)..(1)
<223> OTHER INFORMATION: 2-amino-8-(beta-D-2'-deoxyribofuranosyl)-
      imidazo-[1,2a]-1,3,5-triazin-[8H]-4-one
<220> FEATURE:
<221> NAME/KEY: misc_feature
<222> LOCATION: (25)..(25)
<223> OTHER INFORMATION: 2 aminopurine

<400> SEQUENCE: 141
ncaagaccaa tyctgtcacc tytgnc                                              26

<210> SEQ ID NO 142
<211> LENGTH: 24
<212> TYPE: DNA
<213> ORGANISM: Artificial Sequence
<220> FEATURE:
<223> OTHER INFORMATION: synthetic
<220> FEATURE:
<221> NAME/KEY: misc_feature
<222> LOCATION: (1)..(1)
<223> OTHER INFORMATION: 2-amino-8-(beta-D-2'-deoxyribofuranosyl)-
      imidazo-[1,2a]-1,3,5-triazin-[8H]-4-one
<220> FEATURE:
<221> NAME/KEY: misc_feature
<222> LOCATION: (22)..(22)
<223> OTHER INFORMATION: 2 aminopurine

<400> SEQUENCE: 142
ngcattytgg acaaavcgtc tncg                                                24

<210> SEQ ID NO 143
<211> LENGTH: 24
<212> TYPE: DNA
<213> ORGANISM: Artificial Sequence
<220> FEATURE:
<223> OTHER INFORMATION: synthetic
<220> FEATURE:
<221> NAME/KEY: misc_feature
<222> LOCATION: (1)..(1)
<223> OTHER INFORMATION: 2-amino-8-(beta-D-2'-deoxyribofuranosyl)-
      imidazo-[1,2a]-1,3,5-triazin-[8H]-4-one
<220> FEATURE:
<221> NAME/KEY: misc_feature
<222> LOCATION: (16)..(16)
<223> OTHER INFORMATION: inosine
<220> FEATURE:
<221> NAME/KEY: misc_feature
<222> LOCATION: (22)..(22)
<223> OTHER INFORMATION: 2 aminopurine

<400> SEQUENCE: 143
ngcattytgg acaaancgtc tncg                                                24

<210> SEQ ID NO 144
<211> LENGTH: 24
<212> TYPE: DNA
<213> ORGANISM: Artificial Sequence
<220> FEATURE:

<223> OTHER INFORMATION: synthetic
<220> FEATURE:
<221> NAME/KEY: misc_feature
<222> LOCATION: (1)..(1)
<223> OTHER INFORMATION: 2-amino-8-(beta-D-2'-deoxyribofuranosyl)-
      imidazo-[1,2a]-1,3,5-triazin-[8H]-4-one
<220> FEATURE:
<221> NAME/KEY: misc_feature
<222> LOCATION: (22)..(22)
<223> OTHER INFORMATION: 2 aminopurine

<400> SEQUENCE: 144
ngcattttgg ayaaagcgtc tncg                                          24

<210> SEQ ID NO 145
<211> LENGTH: 23
<212> TYPE: DNA
<213> ORGANISM: Artificial Sequence
<220> FEATURE:
<223> OTHER INFORMATION: synthetic
<220> FEATURE:
<221> NAME/KEY: misc_feature
<222> LOCATION: (1)..(1)
<223> OTHER INFORMATION: 2-amino-8-(beta-D-2'-deoxyribofuranosyl)-
      imidazo-[1,2a]-1,3,5-triazin-[8H]-4-one
<220> FEATURE:
<221> NAME/KEY: misc_feature
<222> LOCATION: (22)..(22)
<223> OTHER INFORMATION: N ethylcytosine

<400> SEQUENCE: 145
ntcctcaayt cactcttcga gng                                           23

<210> SEQ ID NO 146
<211> LENGTH: 22
<212> TYPE: DNA
<213> ORGANISM: Artificial Sequence
<220> FEATURE:
<223> OTHER INFORMATION: synthetic
<220> FEATURE:
<221> NAME/KEY: misc_feature
<222> LOCATION: (1)..(1)
<223> OTHER INFORMATION: 2-amino-8-(beta-D-2'-deoxyribofuranosyl)-
      imidazo-[1,2a]-1,3,5-triazin-[8H]-4-one
<220> FEATURE:
<221> NAME/KEY: misc_feature
<222> LOCATION: (21)..(21)
<223> OTHER INFORMATION: inosine

<400> SEQUENCE: 146
ncggtgctct tgaccaaatt ng                                            22

<210> SEQ ID NO 147
<211> LENGTH: 24
<212> TYPE: DNA
<213> ORGANISM: Artificial Sequence
<220> FEATURE:
<223> OTHER INFORMATION: synthetic
<220> FEATURE:
<221> NAME/KEY: misc_feature
<222> LOCATION: (1)..(1)
<223> OTHER INFORMATION: 2-amino-8-(beta-D-2'-deoxyribofuranosyl)-
      imidazo-[1,2a]-1,3,5-triazin-[8H]-4-one
<220> FEATURE:
<221> NAME/KEY: misc_feature
<222> LOCATION: (22)..(22)
<223> OTHER INFORMATION: N ethylcytosine

<400> SEQUENCE: 147
ncgtcttaat gtagcagaat tnac                                          24

```
<210> SEQ ID NO 148
<211> LENGTH: 24
<212> TYPE: DNA
<213> ORGANISM: Artificial Sequence
<220> FEATURE:
<223> OTHER INFORMATION: synthetic
<220> FEATURE:
<221> NAME/KEY: misc_feature
<222> LOCATION: (1)..(1)
<223> OTHER INFORMATION: 2-amino-8-(beta-D-2'-deoxyribofuranosyl)-
      imidazo-[1,2a]-1,3,5-triazin-[8H]-4-one
<220> FEATURE:
<221> NAME/KEY: misc_feature
<222> LOCATION: (22)..(22)
<223> OTHER INFORMATION: 2 aminopurine

<400> SEQUENCE: 148
natcaatccc attctaacaa gntc                                            24

<210> SEQ ID NO 149
<211> LENGTH: 21
<212> TYPE: DNA
<213> ORGANISM: Artificial Sequence
<220> FEATURE:
<223> OTHER INFORMATION: synthetic
<220> FEATURE:
<221> NAME/KEY: misc_feature
<222> LOCATION: (1)..(1)
<223> OTHER INFORMATION: 2-amino-8-(beta-D-2'-deoxyribofuranosyl)-
      imidazo-[1,2a]-1,3,5-triazin-[8H]-4-one
<220> FEATURE:
<221> NAME/KEY: misc_feature
<222> LOCATION: (19)..(19)
<223> OTHER INFORMATION: 2 aminopurine

<400> SEQUENCE: 149
nggaaacata cgtgaacang c                                               21

<210> SEQ ID NO 150
<211> LENGTH: 21
<212> TYPE: DNA
<213> ORGANISM: Artificial Sequence
<220> FEATURE:
<223> OTHER INFORMATION: synthetic
<220> FEATURE:
<221> NAME/KEY: misc_feature
<222> LOCATION: (1)..(1)
<223> OTHER INFORMATION: 2-amino-8-(beta-D-2'-deoxyribofuranosyl)-
      imidazo-[1,2a]-1,3,5-triazin-[8H]-4-one
<220> FEATURE:
<221> NAME/KEY: misc_feature
<222> LOCATION: (18)..(18)
<223> OTHER INFORMATION: inosine
<220> FEATURE:
<221> NAME/KEY: misc_feature
<222> LOCATION: (20)..(20)
<223> OTHER INFORMATION: 2 aminopurine

<400> SEQUENCE: 150
ngatgactgg aacatagncn c                                               21
```

COMPOSITIONS FOR THE MULTIPLEXED DETECTION OF VIRUSES

CROSS REFERENCE TO RELATED APPLICATIONS

Co-pending U.S. patent application Ser. No. 17/341,605.

STATEMENT OF RIGHTS TO INVENTIONS MADE UNDER FEDERALLY-SPONSORED RESEARCH

Not applicable.

THE NAMES OF PARTIES TO A JOINT RESEARCH AGREEMENT

Not applicable

INCORPORATION BY REFERENCE OF MATERIAL SUBMITTED ON A COMPACT DISK

None

BACKGROUND OF THE INVENTION

1. Field of the Invention

This invention relates to compositions of matter that are used in processes to detect DNA and RNA molecules having specific sequences, especially those that arise from infectious diseases. More specifically, it provides compositions, processes, and conditions that allow the detection of viral RNA by multiplexed PCR. Still more specifically, it concerns processes that incorporate non-standard nucleotides into primers that are used in such compositions and processes.

2. Description of the Related Art

Methods that detect small numbers of nucleic acid molecules (including DNA and RNA, collectively "xNA") from pathogens and other biological agents are useful in diagnostics, research, and biotechnology. In general, the number of xNA molecules that a useful method must detect are too few for them to be detected directly. Accordingly, methods to detect such xNA molecules often begin with a step that "amplifies" a small part of the xNA from the virus.

"Amplification" is a process that yields many product xNA molecules from a small number of starting xNA molecules, which are "targets" or "analytes". Generally, the product xNA molecules ("amplicons") are DNA molecules that have a sequence identical to a segment of the sequence of the target (or its Watson-Crick complement), as in standard PCR. Alternatively, the amplicons may also have other segments introduced to facilitate amplification, as in tagged PCR or loop amplification. In all cases, the amplicons arise by polymerase-catalyzed copying of xNA molecules.

Classically, amplification has been done using the polymerase chain reaction (PCR).[1] Here, a "forward primer" that is substantially Watson-Crick complementary (meaning at least 90% sequence complementary) to a pre-selected region of a target is annealed to the target to form a duplex. Next, the primer-target complex is incubated with a DNA polymerase (or, as appropriate, a reverse transcriptase) and the appropriate 2'-deoxynucleoside triphosphates to yield a Watson-Crick complementary DNA molecule; the target and its complement, as it is formed, are bound in a double stranded double helix. The double strand is then "melted" by heating, typically to temperatures above 80° C., to give the two complementary DNA strands in single stranded form. The mixture is then cooled so that the original target largely binds to a second forward primer, while its complement binds to a "reverse primer", which is designed to be substantially complementary to a preselected segment downstream in the product DNA molecule. Then, polymerase extension is repeated, with both primers extended to give full-length products, again as duplexes (now two in number). The results are multiple copies of a segment of the target molecules between the primer binding sites, as well as multiple copies of the complement. In asymmetric PCR, the ratio of these two primers is different from unity. Non-target sequences can be added to the amplicons from tags on the 5'-ends of those primers.

Conceptually, PCR can be "multiplexed", to amplify multiple targets in the same mixture at the same time. Two primers are added for each target. For each additional target, an additional probe may be added. Each of these, typically, is a single stranded DNA that is present in large amounts.

However, single stranded DNA molecules in high concentrations are prone to hybridize to other single stranded DNA, even if they are not entirely complementary. These hybrids can serve as primer-template combinations, and be elongated by polymerases. A common outcome is a "primer dimer", a byproduct that unproductively consumes PCR resources.

Various strategies are used to handle primer-primer interaction. One in particular incorporates into the primers components of a self-avoiding molecular recognition system (SAMRS).[2] These are nucleotides that replace the standard A, T, C, and G, by molecules (designated in this disclosure as, in bold, a, t, c, and g) that still bind to their formal complements, but do not bind to each other. That is, the A:t, a:T, c:G and g:C pairs all contribute to the stability of a double helix, but the a:t and c:g pairs do not.

The art exemplifies SAMRS used to avoid primer dimers and to improve the ability of polymerase chain reactions to discriminate single nucleotide changes in a target.[3] For example, primers containing SAMRS are used with reverse transcriptase to amplify RNA from RNA viruses carried by mosquitoes.[4] However, the complexity of the systems makes experimentation necessary to obtain primers that contain SAMRS components to work.

These issues became especially important after a new severe respiratory disease was reported in Wuhan China. This disease was shown to arise from a new type of coronavirus, whose sequence was reported in January 2020.[5] This coronavirus is currently causing a world-wide pandemic. The virus is spread both by patients displaying respiratory distress as well as asymptomatic carriers. This creates a need for a highly sensitive and specific diagnostic test that can detect the virus on nasal and oral samples from infected individuals.

Immediately after the sequence was reported,[6] multiple entities developed PCR kits that incorporated reverse transcriptase (RT) to detect the viral RNA, including quantitative PCR (qPCR) kits. Information from of these kits was collected and reported by the WHO [Table 1]. These kits were developed by the following entities: Charité (Germany), Hong Kong University, the Chinese CDC, the United States CDC, and Institut Pasteur (Paris).

The primers and probes from these assays are shown in Table 1. They target segments from the CoV19 genome, specifically the structural gene N, the structural gene E, the nonstructural RNA-dependent RNA polymerase (RdRp), and ORF 1a/b genes.[7] Multiple molecular targets are often included in assay kits, in part in the hope of avoiding cross-reaction with other coronaviruses, and in part to prevent genetic drift of the CoV19 genome from evading detection. This is happening.[8]

Further, as a "positive control", the RNA component of the human RNAse P is often used as a target. Successful identification of an amplicon from human RNase P suggests that the sampling was aggressive enough to capture the coronavirus if it were present, and that the entire sampling-to-result process is working.

TABLE 1

Oligonucleotide primers and probes from nCoV-2019 (Cov19) assays collected by the WHO. Fp = forward primer. Rp = reverse primer. N, N1, N2, and N3 primers target regions in the N gene in the Cov19 genome. E primers target a region in the E gene in the Cov19 genome. RdRp primers target a region in the gene for RNA-dependent RNA polymerase in the Cov19 genome. Orf primers target a region in the open reading frames of gene in the Cov19 genome. RNase P primers target a region in the human RNA that is part of ribonuclease P. SEQ ID NO: 40 and SEQ ID NO: 41, with *, differ from primers in the Pasteur assay by a 5'-extension, in italics.

| Name | SEQ ID | SEQUENCE (5'-3') |
|---|---|---|
| N1-Fp/US CDC | SEQ ID NO: 1 | GAC CCC AAA ATC AGC GAA AT |
| N1-Rp/US CDC | SEQ ID NO: 2 | TCT GGT TAC TGC CAG TTG AAT CTG |
| N1-Probe/US CDC | SEQ ID NO: 3 | ACC CCG CAT TAC GTT TGG TGG ACC |
| N2-Fp/US CDC | SEQ ID NO: 4 | TTA CAA ACA TTG GCC GCA AA |
| N2-Rp/US CDC | SEQ ID NO: 5 | GCG CGA CAT TCC GAA GAA |
| N2-Probe/US CDC | SEQ ID NO: 6 | ACA ATT TGC CCC CAG CGC TTC AG |
| N3-Fp/US CDC | SEQ ID NO: 7 | GGG AGC CTT GAA TAC ACC AAA A |
| N3-Rp/US CDC | SEQ ID NO: 8 | TGT AGC ACG ATT GCA GCA TTG |
| N3-Probe/US CDC | SEQ ID NO: 9 | AYC ACA TTG GCA CCC GCA ATC CTG |
| RNAseP-Fp/US CDC | SEQ ID NO: 10 | AGA TTT GGA CCT GCG AGC G |
| RNAseP-Rp/US CDC | SEQ ID NO: 11 | GAG CGG CTG TCT CCA CAA GT |
| RNAseP-Probe/US CDC | SEQ ID NO: 12 | TTC TGA CCT GAA GGC TCT GCG CG |
| E_Sarbeco_Fp/Charité | SEQ ID NO: 13 | ACA GGT ACG TTA ATA GTT AAT AGC GT |
| E_Sarbeco_Rp/Charité | SEQ ID NO: 14 | ATA TTG CAG CAG TAC GCA CAC A |
| E_Sarbeco_P1/Charité | SEQ ID NO: 15 | ACA CTA GCC ATC CTT ACT GCG CTT CG |
| RdRp_SARSr-Fp/Charité | SEQ ID NO: 16 | GTG ARA TGG TCA TGT GTG GCG G |
| RdRp_SARSr-Rp-S/Charité | SEQ ID NO: 17 | CAR ATG TTA AAS ACA CTA TTA GCA TA |
| RdRp_SARSr-Rp-A/Charité | SEQ ID NO: 18 | CAR ATG TTA AAA ACA CTA TTA GCA TA |
| RdRp_SARSr-P2/Charité | SEQ ID NO: 19 | CAG GTG AAA CCT CAT CAG GAG ATG C |
| N_Sarbeco_Fp/Charité | SEQ ID NO: 20 | CAC ATT GGC ACC CGC AAT C |
| N_Sarbeco_Rp/Charité | SEQ ID NO: 21 | GAG GAA CGA GAA GAG GCT TG |
| N_Sarbeco_Probe/Charité | SEQ ID NO: 22 | ACT TCC TCA AGG AAC AAC ATT GCC A |
| ORF1ab-Fp/China CDC | SEQ ID NO: 23 | CCC TGT GGG TTT TAC ACT TAA |

TABLE 1-continued

Oligonucleotide primers and probes from nCoV-2019 (Cov19) assays collected by the WHO. Fp = forward primer. Rp = reverse primer. N, N1, N2, and N3 primers target regions in the N gene in the Cov19 genome. E primers target a region in the E gene in the Cov19 genome. RdRp primers target a region in the gene for RNA-dependent RNA polymerase in the Cov19 genome. Orf primers target a region in the open reading frames of gene in the Cov19 genome. RNase P primers target a region in the human RNA that is part of ribonuclease P. SEQ ID NO: 40 and SEQ ID NO: 41, with *, differ from primers in the Pasteur assay by a 5'-extension, in italics.

| Name | SEQ ID | SEQUENCE (5'-3') |
| --- | --- | --- |
| ORF1ab-Rp/ China CDC | SEQ ID NO: 24 | ACG ATT GTG CAT CAG CTG A |
| ORF1ab-Probe/ China CDC | SEQ ID NO: 25 | CCG TCT GCG GTA TGT GGA AAG GTT ATG G |
| N-Fp/China CDC | SEQ ID NO: 26 | GGG GAA CTT CTC CTG CTA GAA T |
| N-Rp/China CDC | SEQ ID NO: 27 | CAG ACA TTT TGC TCT CAA GCT G |
| N-Probe/China CDC | SEQ ID NO: 28 | TTG CTG CTG CTT GAC AGA TT |
| RdRp-Hel_Fp/ Hong Kong Univ. | SEQ ID NO: 29 | CGC ATA CAG TCT TRC AGG CT |
| RdRp-Hel_Rp/ Hong Kong Univ. | SEQ ID NO: 30 | GTG TGA TGT TGA WAT GAC ATG GTC |
| RdRp-Hel-Probe/ Hong Kong Univ. | SEQ ID NO: 31 | TTA AGA TGT GGT GCT TGC ATA CGT AGA C |
| ORF1b-Fp/ Hong Kong Univ. | SEQ ID NO: 32 | TGG GGY TTT ACR GGT AAC CT |
| ORF1b-Rp/ Hong Kong Univ. | SEQ ID NO: 33 | AAC RCG CTT AAC AAA GCA CTC |
| ORF1b-Probe/ Hong Kong Univ. | SEQ ID NO: 34 | TAG TTG TGA TGC WAT CAT GAC TAG |
| RdRp_IP2-Fp/ Pasteur | SEQ ID NO: 35 | ATG AGC TTA GTC CTG TTG |
| RdRp_IP2-Rp/ Pasteur | SEQ ID NO: 36 | CTC CCT TTG TTG TGT TGT |
| RdRp_IP2-Probe/ Pasteur | SEQ ID NO: 37 | AGA TGT CTT GTG CTG CCG GTA |
| RdRp_IP4-Fp/ Pasteur-original | SEQ ID NO: 38 | GG TAA CTG GTA TGA TTT CG |
| RdRp_IP4-Rp/ Pasteur-original | SEQ ID NO: 39 | CTG GIC AAG GTT AAT ATA GG |
| RdRp_IP4-Fp */ Pasteur-extended | SEQ ID NO: 40 | *CAAT* GG TAA CTG GTA TGA TTT CG |
| RdRp_IP4-Rp */ Pasteur-extended | SEQ ID NO: 41 | *GCC* CTG GIC AAG GTT AAT ATA GG |
| RdRp_IP4-Probe/ Pasteur-original | SEQ ID NO: 42 | TCA TAC AAA CCA CGC CAG G |

* indicate the 5' of primer is extended with a few more bases (Italic).

Several studies in the art have compared various RT-qPCR diagnostic kits.9 For example, one study evaluated eleven different kits at seven laboratories in Germany in March 2020.10 Various kits in the WHO collection appeared to have low sensitivity. Further, suppliers recommend that the amplicons not all be sought in a single assay. For example, the LabGun and bioMerieux Argene assays need two tubes to detect the E gene and RdRp gene of Cov19. The US CDC assay, a "three tube assay" to detect only N gene.

This suggested to the inventors a need to invent better assays based on better primers.

(g) Brief Summary of the Invention

This specification discloses sets of oligonucleotides that contain components of a self-avoiding molecular recognition system (SAMRS) (FIG. 1) that support highly sensitive multiplexed amplification of RNA from the coronavirus known as nCOV-2019, also called SARS-COV-2, CoV19, CoV-2, and various other names. It further discloses sets of oligonucleotide analogs that, in addition to amplifying RNA from CoV19, also may amplify RNA from other coronaviruses. It further discloses sets of oligonucleotide analogs that, in addition to amplifying RNA from nCOV, also may amplify RNA from other viruses that cause respiratory diseases, such as influenza. Further, for the first time, SAMRS-containing oligonucleotides have been found to work in a Taq-Man formatted assay. Experiments discovered that the SAMRS primers provide better multiplexed PCR than standard primers to amplify RNA in quadruplex and 10-plex PCR. The SAMRS primers offer significantly better performance than the standard primers in 10-plex PCR. Surprisingly, TaqMan PCR with SAMRS primers can use crude samples without RNA isolation, specifically RNA in viral transport media, in environmental swabs (e.g., without limitation, table surfaces), in raw nasal swabs, or in saliva samples. This extraction-free multiplexed PCR with SAMRS primers cannot be achieved by standard primers (at least in the examples shown in this invention, Table 17).

(h) Brief Description of the Drawings

FIG. 1. Chemical structures of the nucleotide analogs, components of a self-avoiding molecular recognition system (SAMRS) that are incorporated into primers, primers that are comprised within compositions of the instant invention. Pairs between standard nucleobases (left). Pairs between standard nucleobases and their SAMRS complements (g, c, a, and t, middle). Pairs between SAMRS nucleobases and their formal SAMRS complements (right); these do not contribute substantially to duplex stability. Su=sugar backbone.

FIG. 2. Components of an artificially expanded genetic information system (AEGIS) presently preferred for incorporation into external tags in the tagged PCR of the instant invention. Su=sugar backbone.

FIG. 3. Speculated origins of primer dimers. Without wishing to be bound by theory, possible explanations for the failure of conventional primers and probes to give easy multiplying at high sensitivity. The N1, N2, and N3 sequences are from the CDC (SEQ ID NO:1, SEQ ID NO:2, SEQ ID NO:3, SEQ ID NO:4, SEQ ID NO:5, SEQ ID NO:6, SEQ ID NO:7, SEQ ID NO:8, SEQ ID NO: 9); the E and RdRp_SARSr are from Charité (SEQ ID NO:13, SEQ ID NO:14, SEQ ID NO: 15, SEQ ID NO:16, SEQ ID NO: 17, SEQ ID NO: 18, SEQ ID NO: 19). Without wishing to be bound by theory, SAMRS components (lower case g, a, and c) may disrupt the indicated interactions, and this might be the mechanism by which they eliminate primer-primer and primer-probe interactions.

Figure 4:
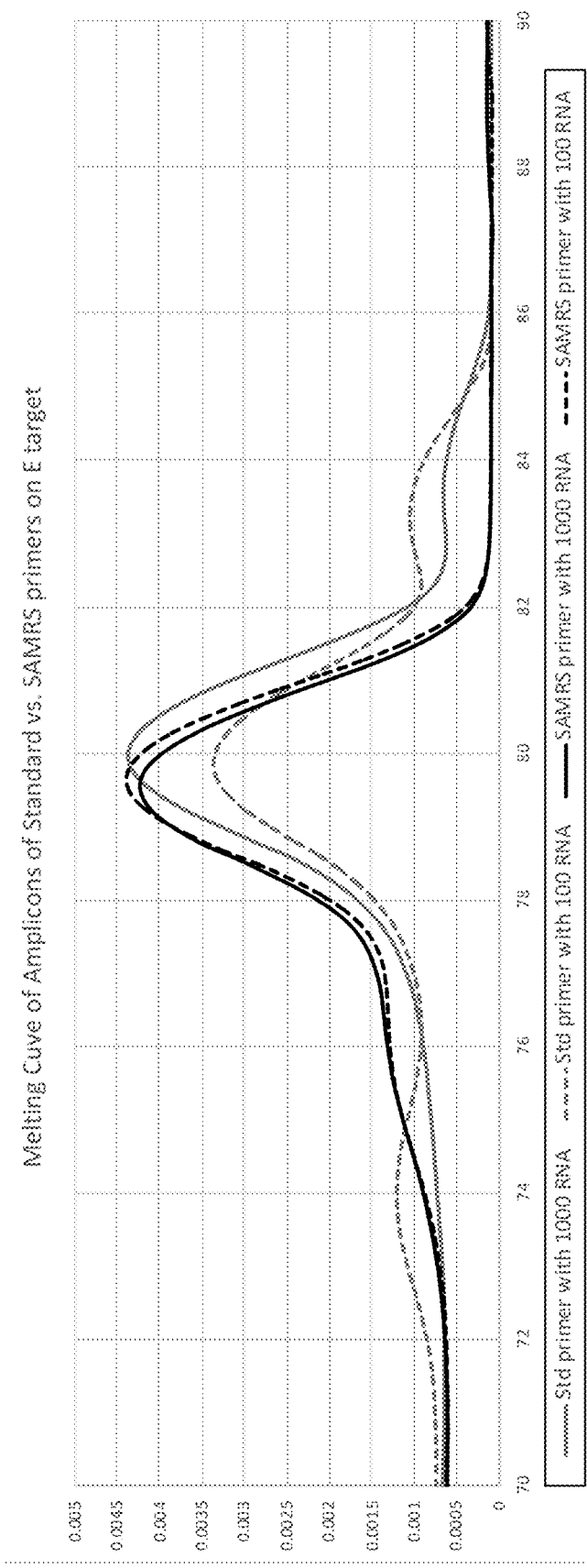

FIG. 4. Melting curves of the single-plex PCR from standard primers (gray color, SEQ ID NO: 13, SEQ ID NO:14) or SAMRS primers (black color, SEQ ID NO:52, SEQ ID NO:53) targeting on E gene (BEI RNA at 1000 and 100 copies per reaction).

Figure 5:
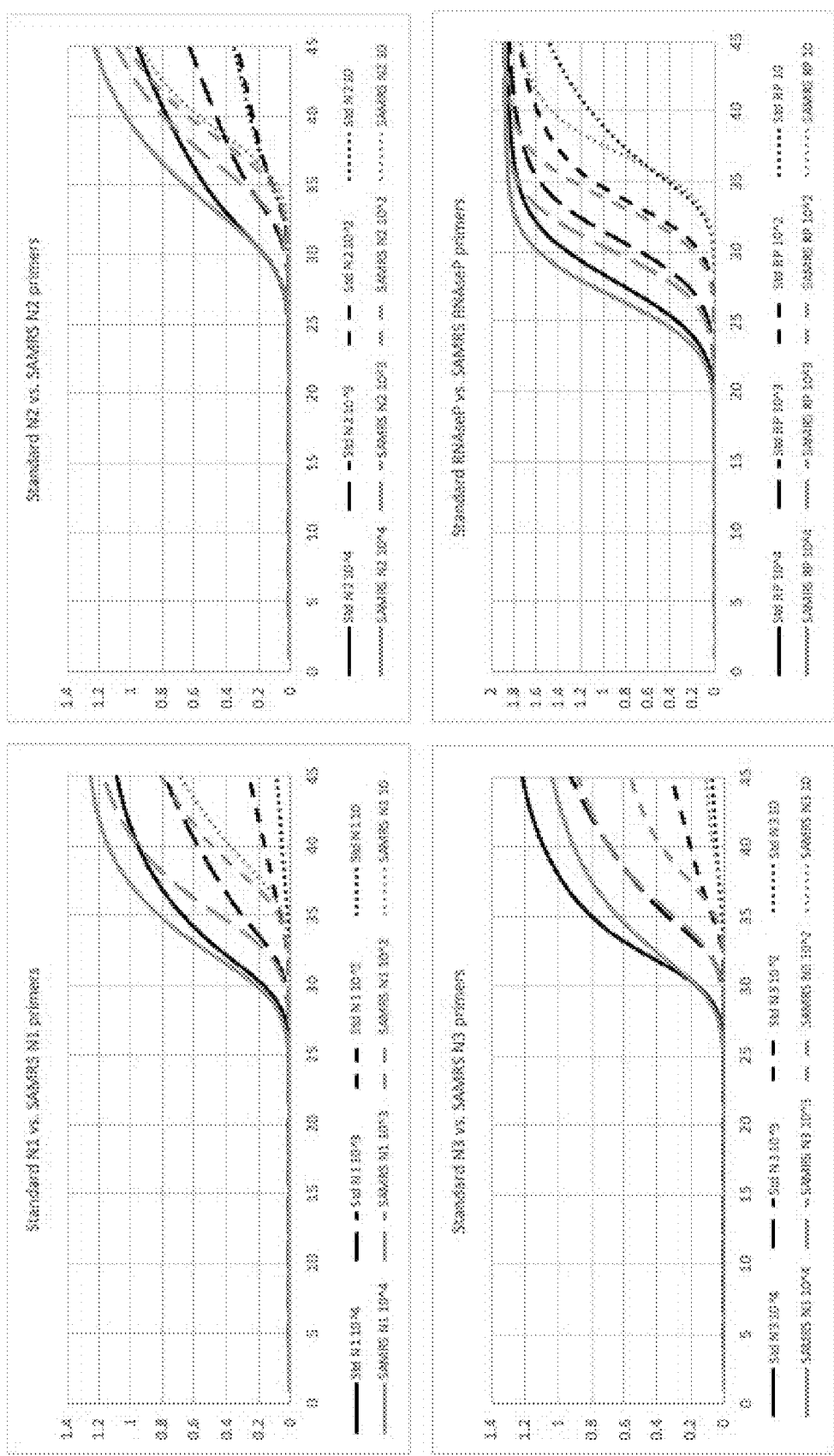

FIG. 5. Amplification curves of CDC standard primers (black) and SAMRS primers (gray) in quadruplex PCR targeting on N1, N2, N3, and RNAse P genes. The N1, N2, N3, and RNAse P standard primer and probe sequences are from the CDC (SEQ ID NO:1, SEQ ID NO:2, SEQ ID NO: 3, SEQ ID NO:4, SEQ ID NO:5, SEQ ID NO:6, SEQ ID NO:7, SEQ ID NO:8, SEQ ID NO: 9, SEQ ID NO:10, SEQ ID NO: 11, SEQ ID NO: 12). The N1, N2, N3, and RNAse P SAMRS modified sequences are from the Firebird (SEQ ID NO:43, SEQ ID NO:44, SEQ ID NO: 46, SEQ ID NO:5, SEQ ID NO:48, SEQ ID NO:49, SEQ ID NO:50, SEQ ID NO:51). Synthetic Twist RNA was served as target at 10000, 1000, 100, and 10 copies per reaction.

Figure 6A:
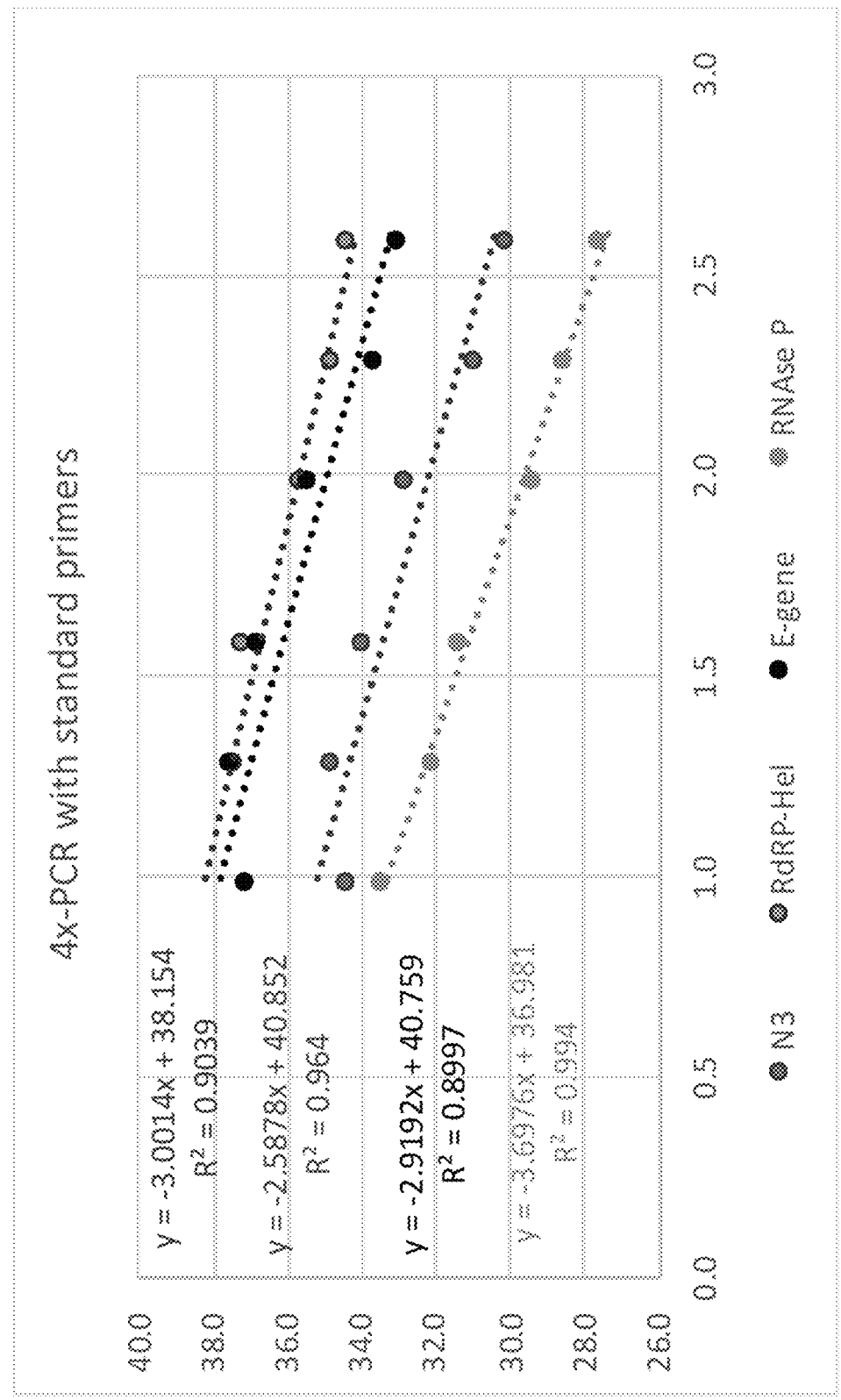

FIG. 6A. Linear regression of standard primers in quadruplex PCR targeting on N3, RdRp-Hel, E, and RNAse P genes (BEI RNA at 400, 200, 100, 40, 20, and 10 copies per reaction).

Figure 6B:
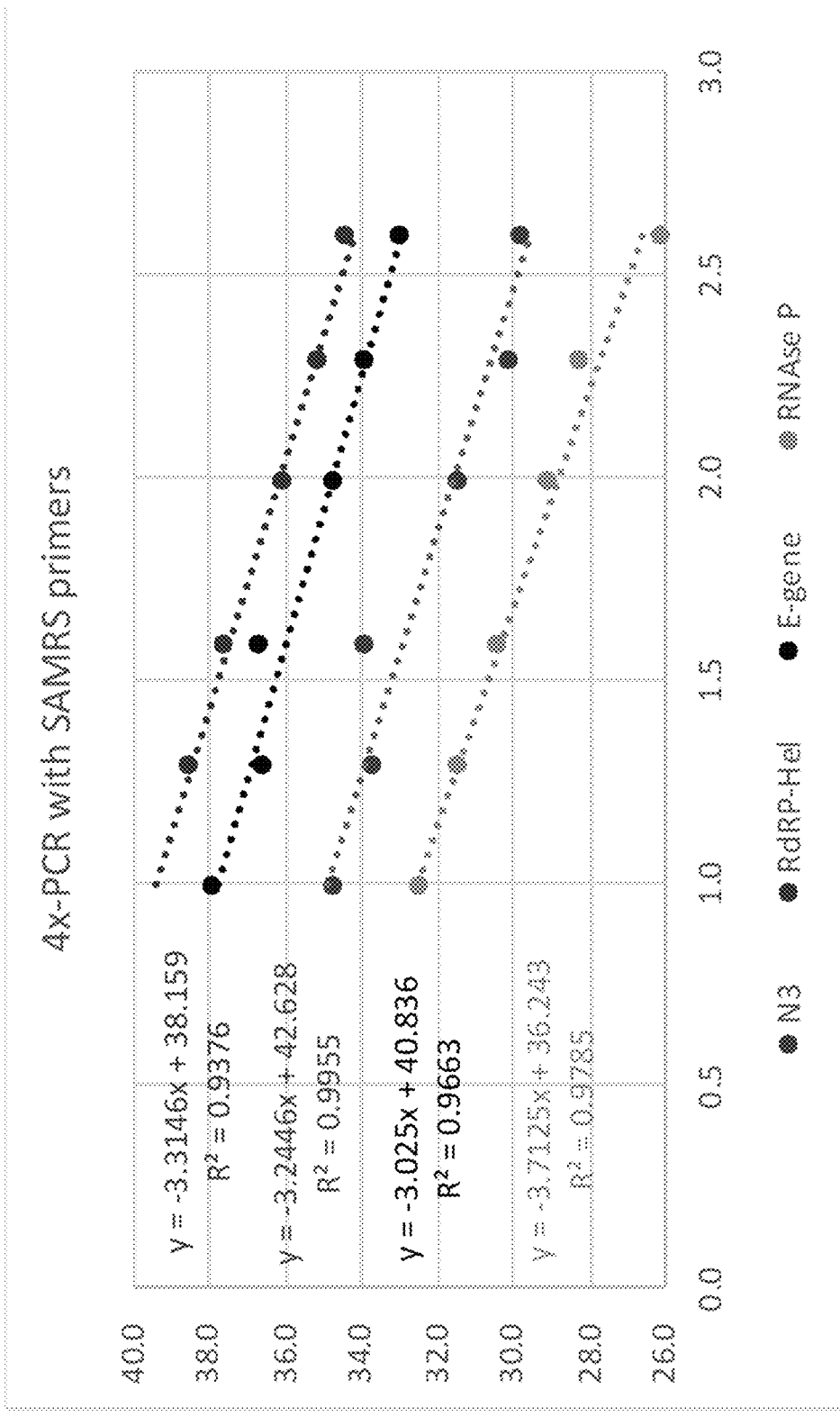

FIG. 6B. Linear regression of SAMRS modified primers in quadruplex PCR targeting on N3, RdRp-Hel, E, and RNAse P genes (BEI RNA at 400, 200, 100, 40, 20, and 10 copies per reaction).

(i) Description of the Invention (i) (1) Sequences Used in the Process of Discovery To create this invention, a process of discovery began with the primers and probes that were reported in the assays collected by the WHO from various individual entities developing coronavirus kits (the US CDC, the China CDC, Institute Pasteur, Hong Kong University, Charité, collectively the "WHO primers"). These are collected in Table 1. In addition, two primers were designed by adding three and four nucleotides (respectively) to the 5'-ends of SEQ ID NO:38 and SEQ ID NO:39 to give SEQ ID NO:40 and SEQ ID NO:41 (Table 1).

This discovery process continued by replacing nucleotides A, T, G, and C within those Table 1 primers by components of a self avoiding molecular recognition system (SAMRS, FIG. 1) designated by (in bold) a, t, g, and c. Many of the SAMRS-containing primers are in Table 2. In addition, the inventors examined the coronavirus sequences in the database, as well as the sequences of related coronaviruses, and designed their own primers based on the comparisons of these. These are collected in Table 3, when they are built from entirely natural nucleotides. The sequences with SAMRS components, as well as sequences with components of an artificially expanded genetic information system (AEGIS), are collected Table 4.

TABLE 2

Primers created by replacing nucleotides A, T, G, and C in primers in Table 1 with components of a self-avoiding molecular recognition system (SAMRS, FIG. 1). The replacements are designated by (in lower case bold) a, t, g, and c. from the WHO list with simple SAMRS substitutions.

| Name | SEQ ID | SEQUENCE (5'-3') |
|---|---|---|
| N1-Fp/US CDC | SEQ ID NO: 43 | GAC CCC AAA ATC AGC GAa AT |
| N1-Rp/US CDC | SEQ ID NO: 44 | TCT GGT TAC TGC CAG TTG AAT cTG |
| N2-Fp-aa/US CDC | SEQ ID NO: 45 | TTA CAA ACA TTG GCC GCa aA |
| N2-Fp-a/US CDC | SEQ ID NO: 46 | TTA CAA ACA TTG GCC GCA aA |
| N2-Rp/US CDC | SEQ ID NO: 47 | GCG CGA CAT TCC GAA GaA |
| N3-Fp/US CDC | SEQ ID NO: 48 | GGG AGC CTT GAA TAC ACC Aaa A |
| N3-Rp/US CDC | SEQ ID NO: 49 | TGT AGC ACG ATT GCA GCa TTG |
| RNAseP-Fp/US CDC | SEQ ID NO: 50 | AGA TTT GGA CCT GCG AGc G |
| RNAseP-Rp/US CDC | SEQ ID NO: 51 | GAG CGG CTG TCT CCA CAA gT |
| E_Sarbeco_Fp/Charité | SEQ ID NO: 52 | ACA GGT ACG TTA ATA GTT AAT AGc gT |
| E_Sarbeco_Rp/Charité | SEQ ID NO: 53 | ATA TTG CAG CAG TAC GCA CAc A |
| RdRp_SARSr-Fp/Charité | SEQ ID NO: 54 | GTG ARA TGG TCA TGT GTG GCg G |
| RdRp_SARSr-Rp-S/Charité | SEQ ID NO: 55 | CAR ATG TTA AAS ACA CTA TTA GCa TA |
| RdRp_SARSr-Rp-A/Charité | SEQ ID NO: 56 | CAR ATG TTA AAA ACA CTA TTA GCa TA |
| N Sarbeco Fp/Charité | SEQ ID NO: 57 | CAC ATT GGC ACC CGC AaT C |
| N Sarbeco Rp/Charité | SEQ ID NO: 58 | GAG GAA CGA GAA GAG GcT TG |
| ORF1ab-Fp/China CDC | SEQ ID NO: 59 | CCC TGT GGG TTT TAC ACT TaA |
| ORF1ab-Rp/China CDC | SEQ ID NO: 60 | ACG ATT GTG CAT CAG CTg A |
| N-Fp/China CDC | SEQ ID NO: 61 | GGG GAA CTT CTC CTG CTA gAA T |
| N-Rp/China CDC | SEQ ID NO: 62 | CAG ACA TTT TGC TCT CAA GcT G |
| RdRp-Hel_Fp/Hong Kong Univ. | SEQ ID NO: 63 | CGC ATA CAG TCT TRC AGg CT |
| RdRp-Hel_Rp/Hong Kong Univ. | SEQ ID NO: 64 | GTG TGA TGT TGA WAT GAC ATG gTC |
| ORF1b-Fp/Hong Kong Univ. | SEQ ID NO: 65 | TGG GGY TTT ACR GGT AAc CT |
| ORF1b-Rp/Hong Kong Univ. | SEQ ID NO: 66 | AAC RCG CTT AAC AAA GCA cTC |
| RdRp_IP2-Fp/Pasteur | SEQ ID NO: 67 | ATG AGC TTA GTC CTg TTG |
| RdRp_IP2-Rp/Pasteur | SEQ ID NO: 68 | CTC CCT TTG TTG TGT TgT |
| RdRp_IP4-Fp/Pasteur-original | SEQ ID NO: 69 | GG TAA CTG GTA TGA TTT cG |

TABLE 2-continued

Primers created by replacing nucleotides A, T, G, and C in primers in Table 1 with components of a self-avoiding molecular recognition system (SAMRS, FIG. 1). The replacements are designated by (in lower case bold) a, t, g, and c. from the WHO list with simple SAMRS substitutions.

| Name | SEQ ID | SEQUENCE (5'-3') |
|---|---|---|
| RdRp_IP4-Rp/ Pasteur-original | SEQ ID NO: 70 | CTG GTC AAG GTT AAT ATa GG |
| RdRp_IP4-Fp */ Pasteur-extended | SEQ ID NO: 71 | *CAAT GG* TAA CTG GTA TGA TTT cG |
| RdRp_IP4-Rp */ Pasteur-extendeds | SEQ ID NO: 72 | *GCC* CTG GTC AAG GTT AAT ATa GG |

* indicate the 5' of primer is extended with a few more bases (Italic).

TABLE 3

Oligonucleotide primers designed by the inventors by analysis of the CoV19 genome with standard nucleotides.

| Name | SEQ ID | SEQUENCE (5'-3') |
|---|---|---|
| Tagged N1-Fp | SEQ ID NO: 73 | CTCGACCGCTA GAC CCC AAA ATC AGC GAA AT |
| Tagged N1-Rp | SEQ ID NO: 74 | CTCGACCGCTA TCT GGT TAC TGC CAG TTG AAT CTG |
| Tagged N2-Fp | SEQ ID NO: 75 | CTCGACCGCTA TTA CAA ACA TTG GCC GCA AA |
| Tagged N2-Rp | SEQ ID NO: 76 | CTCGACCGCTA GCG CGA CAT TCC GAA GAA |
| N4-Fp/Firebird | SEQ ID NO: 77 | CGCGATCAAAACAACGTC |
| N4-Rp/Firebird | SEQ ID NO: 78 | CATCTGGACTGCTATTGG |
| Tagged N4-Fp/ Firebird | SEQ ID NO: 79 | CTCGACCGCTA CGCGATCAAAACAACGTC |
| Tagged N4-Rp/ Firebird | SEQ ID NO: 80 | CTCGACCGCTA CATCTGGACTGCTATTGG |
| N4-Probe/Firebird | SEQ ID NO: 81 | ATACTGCGTCTTGGTTCACC |
| MERS-1-Fp/ Firebird | SEQ ID NO: 82 | GGGTGTACCTCTTAATGCC |
| MERS-1-Rp/ Firebird | SEQ ID NO: 83 | GTCCAGTTCCAGTGTAGTAG |
| MERS-2-Fp/ Firebird | SEQ ID NO: 84 | CACTGATGCTCCTTCAAC |
| MERS-2-Rp/ Firebird | SEQ ID NO: 85 | AGATGATTGACTATTGCCTCC |
| MERS-3-Fp/ Firebird | SEQ ID NO: 86 | CACTTCTCCAGGTCCATC |
| MERS-3-Rp/ Firebird | SEQ ID NO: 87 | CAGCAGCATCTTTCTTAGTG |
| SARS-1-Fp/ Firebird | SEQ ID NO: 88 | CCAGATGGTACTTCTATTAC |
| SARS-1-Rp/ Firebird | SEQ ID NO: 89 | TTGCAACCCATACGATGC |
| SARS-2-Fp/ Firebird | SEQ ID NO: 90 | CGTCTTGGTTCACAGCTC |

TABLE 3-continued

Oligonucleotide primers designed by the inventors by analysis of the CoV19 genome with standard nucleotides.

| Name | SEQ ID | SEQUENCE (5'-3') |
| --- | --- | --- |
| SARS-2-Rp/Firebird | SEQ ID NO: 91 | TCATCTGGACCACTATTG |
| SARS-3-Fp/Firebird | SEQ ID NO: 92 | CAGTACAACGTCACTCAAGC |
| SARS-3-Rp/Firebird | SEQ ID NO: 93 | CCAAAGAATGCAGAGGCAC |

TABLE 4

Primers created by replacing nucleotides A, T, G, and C in primers in Table 3 with components of a self-avoiding molecular recognition system (SAMRS, FIG. 1). The replacements are designated by (in lower case bold) a, t, g, and c.

| Name | SEQ ID | SEQUENCE (5'-3') |
| --- | --- | --- |
| Tagged N1-Fp | SEQ ID NO: 94 | CTCPACCPCTA GAC CCC AAA ATC AGC GAa AT |
| Tagged N1-Rp | SEQ ID NO: 95 | CTCPACCPCTA TCT GGT TAC TGC CAG TTG AAT cTG |
| Tagged N2-Fp | SEQ ID NO: 96 | CTCPACCPCTA TTA CAA ACA TTG GCC GCa aA |
| Tagged N2-Rp | SEQ ID NO: 97 | CTCPACCPCTA GCG CGA CAT TCC GAA GaA |
| N4-Fp/Firebird | SEQ ID NO: 98 | CGCGATCAAAACAACgTC |
| N4-Rp/Firebird | SEQ ID NO: 99 | CATCTGGACTGCTATTgG |
| Tagged N4-Fp/Firebird | SEQ ID NO: 100 | CTCPACCPCTA CGCGATCAAAACAACgTC |
| Tagged N4-Rp/Firebird | SEQ ID NO: 101 | CTCPACCPCTA CATCTGGACTGCTATTgG |
| Tagged N1-Fp-samrs | SEQ ID NO: 102 | P GAC CCC AAA ATC AGC GAa AT |
| Tagged N1-Rp-samrs | SEQ ID NO: 103 | P TCT GGT TAC TGC CAG TTG AAT cTG |
| Tagged N2-Fp-samrs-a | SEQ ID NO: 104 | P TTA CAA ACA TTG GCC GCA aA |
| Tagged N2-Fp-samrs-aa | SEQ ID NO: 105 | P TTA CAA ACA TTG GCC GCa aA |
| Tagged N2-Rp-samrs | SEQ ID NO: 106 | P GCG CGA CAT TCC GAA GaA |
| Tagged N3-Fp-samrs | SEQ ID NO: 107 | P GGG AGC CTT GAA TAC ACC Aaa A |
| Tagged N3-Rp-samrs | SEQ ID NO: 108 | P TGT AGC ACG ATT GCA GCa TTG |
| Tagged RNAseP-Fp-samrs | SEQ ID NO: 109 | P AGA TTT GGA CCT GCG AGc G |
| Tagged RNAseP-Rp-samrs | SEQ ID NO: 110 | P GAG CGG CTG TCT CCA CAA gT |
| Tagged E_Sarbeco_Fp-samrs | SEQ ID NO: 111 | P ACA GGT ACG TTA ATA GTT AAT AGc gT |
| Tagged E_Sarbeco_Rp-samrs | SEQ ID NO: 112 | P ATA TTG CAG CAG TAC GCA CAc A |

TABLE 4-continued

Primers created by replacing nucleotides A, T, G, and C in primers in Table 3 with components of a self-avoiding molecular recognition system (SAMRS, FIG. 1). The replacements are designated by (in lower case bold) a, t, g, and c.

| Name | SEQ ID | SEQUENCE (5'-3') |
|---|---|---|
| Tagged RdRp-Hel_Fp-samrs | SEQ ID NO: 113 | P CGC ATA CAG TCT TRC AGg CT |
| Tagged RdRp-Hel_Rp-samrs | SEQ ID NO: 114 | P GTG TGA TGT TGA WAT GAC ATG gTC |
| Tagged RdRp_IP4-Fp-samrs * | SEQ ID NO: 115 | P CAAT GG TAA CTG GTA TGA TTT cG |
| Tagged RdRp_IP4-Rp-samrs * | SEQ ID NO: 116 | P GCC CTG GTC AAG GTT AAT ATa GG |
| MERS-1-Fp/Firebird | SEQ ID NO: 117 | GGGTGTACCTCTTAATGcC |
| MERS-1-Rp/Firebird | SEQ ID NO: 118 | GTCCAGTTCCAGTGTAgTAG |
| MERS-2-Fp/Firebird | SEQ ID NO: 119 | CACTGATGCTCCTTCAaC |
| MERS-2-Rp/Firebird | SEQ ID NO: 120 | AGATGATTGACTATTGCcTcC |
| MERS-3-Fp/Firebird | SEQ ID NO: 121 | CACTTCTCCAGGTCcaTC |
| MERS-3-Rp/Firebird | SEQ ID NO: 122 | CAGCAGCATCTTTCTTAgTG |
| SARS-1-Fp/Firebird | SEQ ID NO: 123 | CCAGATGGTACTTCTaTTAC |
| SARS-1-Rp/Firebird | SEQ ID NO: 124 | TTGCAACCCATACGATgC |
| SARS-2-Fp/Firebird | SEQ ID NO: 125 | CGTCTTGGTTCACAGcTC |
| SARS-2-Rp/Firebird | SEQ ID NO: 126 | TCATCTGGACCACTaTTG |
| SARS-3-Fp/Firebird | SEQ ID NO: 127 | CAGTACAACGTCACTCAaGC |
| SARS-3-Rp/Firebird | SEQ ID NO: 128 | CCAAAGAATGCAGAGGcaC |

* indicates the 5' of primer is extended with a few more bases (Italic).

(i) (2) Reduction to practice. Synthetic procedures used in the process of discovery Standard and SAMRS-containing oligonucleotides (primers) were synthesized by standard solid phase phosphoramidite synthesis. Standard phosphoramidites were dimethylformamidine-dG, Acetyl-dC, Benzoyl-dA, and unprotected dT. SAMRS phosphoramidites were unprotected g, c protected as an acetylated derivative, and a protected as a dimethylformamidine deriative. SAMRS-containing oligonucleotides were deprotected in aqueous ammonium hydroxide (28%-33% NH₃ in water) at 55° C. overnight (10-12 hours). They were then purified by ion-exchange HPLC (Dionex DNAPac PA-100, 22×250 mm column), and desalted over SepPak cartridges. The purity of each oligonucleotide component of the compositions of the instant invention was analyzed by analytical ion-exchange HPLC. For compositions, SAMRS-containing oligonucleotides were purified by ion-exchange HPLC to meet a purity standard >90%.

(i) (3) Targets used to test compositions of the instant invention

Various CoV19 materials, simulants, and human analog materials, were used as PCR targets:

1. A plasmid from Integrated DNA Technologies (IDT, Cat #10006625) was used to simulate the viral nucleocapsid N-gene. This product contains the complete N gene.

2. The Hs_RPP30 plasmid from Integrated DNA Technologies (IDT, Cat #10006626), contains a portion of the human RNAse P gene, was used to simulate RNAse P gene.

3. Synthetic full-length coronavirus RNA simulant from Twist. RNA Control 1 (MT007544.1) —SKU: 102019 and (MN908947.3)-SKU: 102024. This is an RNA target covering the entire CoV19 genome 4. Heat-inactivated whole coronavirus from BEI. This material was isolated from an oropharyngeal swab from a patient (USA-WA1/2020) and heated at 65° C. for 30 minutes. The complete genome of SARS-COV-2 has been sequenced after the isolation (GenBank: MN985325).

5. SARS-COV-2 RT-qPCR extraction control (BEI Resource, NR-52350) was isolated from a patient (BEI Resource, NR-52286, USA-WA1/2020) and diluted into Homo sapiens lung carcinoma cells (A549; ATCC® CCL-185™), for use as an extraction control in qPCR assays.

6. Human RNA Control (Fisher #4307281, 50 ng/μL) serves as human RNA background and internal control of the RNAse P gene.

(i) (4) Presently Preferred Samples

Without limitation, standard human specimens may be used with the compositions of the current invention. These include samples obtained from individuals by swabbing the nose or mouth. The swab may then be placed in a tube that may be filled with liquid (media) that maintains the sample for transport to the lab. RNA may be recovered from any of commercial available purification kits in a final volume of 30-50 μL. A portion (5 μL or 10 μL) of this "purified" RNA sample is added to a 20 μL or 25 μL of PCR assay.

(i) (5) Processes used in the process of discovery with singleplexed PCR, and presently preferred in the use of compositions of the instant invention.

SAMRS is used in the art in standard PCR, where intercalation dye (e.g. EvaGreen), TaqMan probes, or gel electrophoresis are commonly used. To test the compositions of the instant invention, they were used in a TaqMan architecture. Table 5 lists the reagents that are presently preferred. The TaqPath™ 1-Step RT-qPCR Master Mix can be replaced by the 4x enzyme mixture of the Quantabio UltraPlex™ 1-Step ToughMix® (Quantabio, 95166-01K) or replaced by the One Step PrimeScript™ III RT-PCR Kit (Takara Bio, RR600B), which is our presently preferred enzyme system.

TABLE 5

RT-PCR Enzyme Master mix Options

| Vendor | Enzyme Mastermix | Catalog No. |
|---|---|---|
| ThermoFisher | TaqPath ™ 1-Step RT-qPCR Master Mix, CG (4x) | A15299 |
| Quantabio | UltraPlex 1-Step ToughMix ™ (4X) | 95166-01K |
| Promega | GoTaq ® Probe 1- Step RT-qPCR System (2x) | A6121 |
| ThermoFisher | SuperScript ™ III Platinum ™ One-Step qRT-PCR Kit (2x) | 11732088 |
| Takara Bio | One Step PrimeScript ™ III RT-PCR Kit (2x) | RR600B |
| New England Biolab | Luna ® Universal Probe One-Step RT-qPCR Kit (2x) | E3006X |
| Bio-Rad | Reliance One-Step Multiplex RT-qPCR Supermix ™ | 12010220 |

The ability of various primers to support PCR was measured by real time PCR, including PCR whose results were quantitated by dye intercalation (e.g. EvaGreen), and by TaqMan style assays. SAMRS is used in the art in standard PCR by both TaqMan and intercalation dye.

Metrics for PCR performance included Ct, the number of cycles of PCR required to cross a threshold. Ct indicates the efficiency of amplification, with lower Ct values corresponding to higher efficiency. The signal at the end of the amplification was also used as a metric; higher signals are preferred, as they indicate that less of the PCR resources were diverted to off-target products. Finally, sensitivity (or limit of detection, LOD) was metricked by determining levels of targets that gave acceptable Ct values. A Ct of 40 or more is considered to be a "failed" assay.

A series of monoplexed RT-PCR TaqMan experiments were performed to metric the ability of various standard primers and probes to support PCR amplification. In general, a total assay volume (20 μL) contained 4X master reaction mixture (5 μL, TaqPath™ 1-Step RT-qPCR Master Mix, ThermoFisher, A15299), forward and reverse primers (1.0-0.1 μM, final concentration), probe (0.05-0.3 μM), and RNA sample (5 μL). RT-PCR experiments were conducted on a Roche LightCycler® (models 96 or 480) with reverse transcription initiated at 53° C. for 5-10 min. Then, reverse transcriptase was inactivated at 95° C. for 0.5-2 min, and 40-50 cycles of PCR amplification were performed with (denaturing at 95° C. for 2-10 seconds and annealing/extending at 56-60° C. for 20-40 seconds). A representative sample of individual assays are described in individual examples. Results are collected in Table 6.

TABLE 6

Ct of standard primers using TaqMan PCR

Ct of standard primers using TaqMan PCR

| RNA copies/assay | 10000 | 1000 | 100 | 10 |
|---|---|---|---|---|
| N1 US CDC SEQ ID NO: 1, SEQ ID NO: 2 | 27.0 | 30.5 | 34.5 | 36.5 |
| N2 US CDC SEQ ID NO: 4, SEQ ID NO: 5 | 27.7 | 31.0 | 35.6 | 35.6* |
| N3 US CDC SEQ ID NO: 7, SEQ ID NO: 8 | 28.0 | 31.0 | 35.3 | 36.2* |
| RNAse P SEQ ID NO: 10, SEQ ID NO: 11 | 28.8 | 28.7 | 28.9 | 28.3 |
| E WHO SEQ ID NO: 13, SEQ ID NO: 14 | 27.1 | 31.4 | 34.5 | 37.0 |
| RdRp WHO SEQ ID NO: 16, SEQ ID NO: 17 | 32.1 | 36.7 | NA | NA |
| N WHO SEQ ID NO: 20, SEQ ID NO: 21 | 28.9 | 32.6 | 36.2 | NA |
| ORF1ab CCDC SEQ ID NO: 23, SEQ ID NO: 24 | 26.6 | 30.0 | 34.4* | NA |
| N CCDC SEQ ID NO: 26, SEQ ID NO: 27 | 27.6 | 31.1 | 36.2 | 36.4* |
| RdRp/Hel HK SEQ ID NO: 29, SEQ ID NO: 30 | 29.2 | 32.8 | 36.2 | 37.6* |
| ORF1b HK SEQ ID NO: 32, SEQ ID NO: 33 | 29.7 | 32.8 | 36.4* | 37.3* |
| RdRp IP4 France SEQ ID NO: 38, SEQ ID NO: 39 | 28.1 | 30.8 | 35.0 | NA |

Two repeats for each assay.
*indicate 1/2 gave signal.
NA = No Amplification.

(i) (5) (A) SAMRS-containing primers often performed worse or failed entirely in PCR Initial experiments with primers containing SAMRS generally did not yield improved results, and in many cases yielded worse results than the standard primers; occasionally replacing standard nucleotides by SAMRS nucleotides caused failures. These are exemplified by three examples that targeted the N2 gene using primers recommended by the CDC, targeted the N4 gene by primers designed by the inventors, and targeted the RdRp-IP4 gene using primers from Pasteur.

For example, standard A was replaced by SAMRS a at positions 18 and 19 of the forward primer for the N2 gene (SEQ ID NO:4, from the CDC set) to give SEQ ID NO:45, and at position 17 of the reverse primer for the N2 gene (SEQ ID NO:5, from the CDC set) to give SEQ ID NO: 47. The changes caused the Ct to worsen from 28.0 to 35.6 with 10000 copies of target (Table 7), and caused Ct of the amplification at 1000 copies to fall from Ct=31.6 to 40.8. A Ct >40 is considered a failure for 1000 copies of target per PCR (Table 7).

TABLE 7

Ct of TaqMan PCR using standard or SAMRS primers show that SAMRS often damages the performance of PCR targeting on N gene.

| | Ct values of SAMRS vs standard primers in single-plex PCR | | | | Ct values of SAMRS vs standard primers in single-plex PCR | | | |
|---|---|---|---|---|---|---|---|---|
| | Primer Types Primer without tag sequence | | | | Primer Types Primer with tag sequence | | | |
| RNA Target copies/ reaction | 10000 | 1000 | NTC | RNA Target copies/ reaction | 10000 | 1000 | NTC |
| N2 standard primers SEQ ID NO: 4, SEQ ID NO: 5 | 28.0 | 31.6 | | N2 standard primers with tag SEQ ID NO: 75, SEQ ID NO: 76 | 29.9 | 32.1 | |
| N2 SAMRS primers SEQ ID NO: 45, SEQ ID NO: 47 | 35.6 | 40.8 | | N2 SAMRS primers with tag SEQ ID NO: 96, SEQ ID NO: 97 | 31.2 | 34.9 | |
| N4 standard primers SEQ ID NO: 77, SEQ ID NO: 78 | 29.1 | 32.6 | | N4 standard primers with tag SEQ ID NO: 79, SEQ ID NO: 80 | 30.8 | 33.8 | |
| N4 SAMRS primers SEQ ID NO: 98, SEQ ID NO: 99 | 35.9 | 40.9 | | N4 SAMRS primers with tag SEQ ID NO: 100, SEQ ID NO: 101 | 32.8 | 36.6 | |

As a second example, N4 primers targeting the N gene were designed by the inventors using available knowledge in the art. For example, PCR with the standard N4 primers (SEQ ID NO:77 and SEQ ID NO:78, Table 3) gave amplifications with Ct values of 29.1 and 32.6 for 10000 and 1000 copies of target per reaction, respectively (Table 7). When standard G at positions 16 and 17 of N4 primers were replaced by SAMRS g to give SAMRS modified primers (SEQ ID NO:98 and SEQ ID NO:99, Table 4), the Ct values worsened to 35.9 and 40.9, the second considered to be failed amplification (Table 7).

As a third example, the Institute Pasteur offered two different primer pairs that targeted the RNA-dependent RNA polymerase (RdRp) gene (SEQ ID NO:35 and SEQ ID NO:36, and SEQ ID NO: 38 and SEQ ID NO:39, respectively, Table 1). Experiments discovered that the sensitivity from the second pair of standard primers was better than the sensitivity from the first, which was therefore set aside. Then, C at position 18 replaced in SEQ ID NO:38 was replaced by SAMRS c to give SEQ ID NO:69, and the A at position 18 in SEQ ID NO:39 was replaced by SAMRS a to give SEQ ID NO:70 (Table 2). In single-plex PCR, the SEQ ID 69 and SEQ ID NO: 70 primers produced lower PCR efficiency by ~5 cycles relative to the standard primers in TaqMan PCR (Table 8). The SAMRS-containing (SEQ ID NO:69 and SEQ ID NO:70) failed to give signals in the PCR with EvaGreen (Table 8).

TABLE 8

Ct of TaqMan PCR using standard or SAMRS primers show that SAMRS often damages the performance of PCR targeting on RdRp gene. Comparing the performance of SAMRS primers to Pasteur standard primers

| | Detection Method | | | | | |
|---|---|---|---|---|---|---|
| | TaqMan Probe (detected with Hex setting) | | | EvaGreen (detected with FAM setting) | | |
| BEI viral RNA copies/ reaction | 1000 | 100 | NTC | 1000 | 100 | NTC |
| RdRp-IP4_Std SEQ ID NO: 38, SEQ ID NO: 39 | 32.6 | 36 | NS | 38.9 | 40.1 | 40.0 (100% dimer) |
| RdRp-IP4_Std * SEQ ID NO: 40, SEQ ID NO: 41 | 32.6 | 35.8 | NS | 34.5 | 37.1 | 41.22 (50% dimer) |
| RdRp-IP4_samrs SEQ ID NO: 69, SEQ ID NO: 70 | 37.6 | 40.4 | NS | NS | NS | NS |
| RdRp-IP4_samrs * SEQ ID NO: 71, SEQ ID NO: 72 | 31.4 | 35.1 | NS | 34.7 | 37.2 | NS |

* indicate the 5' of primer is extended with a few more bases (Table 1 and Table 2).
NTC = No Target Control.
NS = No Signal.

In some cases, the impact of adding SAMRS worsened performance without delivering failures. For example, standard A's were replaced in the N2 forward tagged primer (SEQ ID NO: 75, Table 3) at positions 29 and 30 by SAMRS a to give SEQ ID NO:96 (Table 4), and at position 28 in the N2 reverse tagged primer (SEQ ID NO:76) to give SEQ ID NO:97. With 10000 copies, Ct worsened from 29.9 to 31.2; with 1000 copies, Ct worsened from 32.1 to 34.9 (Table 7). Likewise, when standard G's at positions 27 and 28 in the N4 standard tagged primers (SEQ ID NO:79 and SEQ ID NO:80, Table 3) were replaced by SAMRS g to give SEQ ID NO: 100 and 101 (Table 4), the Ct values worsened from 30.8 and 33.8 to 32.8 and 36.6 (Table 7).

(i) (5) (B) Experiments were Done to Invent the Instantly Claimed Compositions

These results prompted a series of experiments to find useful combinations of SAMRS nucleotides, standard nucleotides, their positions, and the lengths of primers that contain them. For example, in some cases, improvement was seen by simply leaving out a SAMRS component. For example, to obtain useful N2 primers, a single A was replaced in the N2 forward primer (SEQ ID NO:4, Table 1) at site 19 by a single SAMRS a to give (SEQ ID NO:46, Table 2). Then, amplification was tested with a reverse primer that lacked any SAMRS component (SEQ ID NO: 5). This pair of primers was shown to give approximately the same level of performance as the standard primers in single-plex PCR (Table 9).

TABLE 9

Ct of TaqMan PCR using standard N2 primers or primers with few SAMRS modification in single-plex PCR.

| Ct values of SAMRS vs standard primers in single-plex PCR | | | |
|---|---|---|---|
| RNA target copies/reaction | 10000 | 1000 | NTC |
| Standard N2 forward and standard N2 reverse primers SEQ ID NO: 4, SEQ ID NO: 5 | 26.8 | 30.3 | |
| SAMRS N2 forward primer and standard N2 reverse primer SEQ ID NO: 46, SEQ ID NO: 5 | 27.0 | 30.6 | |

In some cases, useful primers were obtained by lengthening the primers. Without wishing to be bound by theory, the melting temperatures (TmS) of the standard RdRp-IP4 primers (SEQ ID NO: 38 and SEQ ID NO:39, Table 1) are ~2° C. lower than the optimal 60° C. for TaqMan PCR. Here, for the Institute Pasteur primers recommended to target the RdRp-gene, four nucleotides (CAAT) were added to extend the 5'-end of the forward primer (SEQ ID NO:38) and three nucleotides (GCC) were added to extend the 5'-end of the reverse primer of the reverse primer (SEQ ID NO:39) to give extended primers for the RdRp target (SEQ ID NO:40 and SEQ ID NO: 41); the sequences of these extensions were chosen to allow the 4 and 3 added nucleotides to be Watson-Crick complementary to the CoV19 consensus sequences. Separately, the same extensions were added to the SAMRS-containing SEQ ID NO:69 and SEQ ID NO:70 to give SEQ ID NO:71 and SEQ ID NO:72 (Table 2).

The performance of standard SEQ ID NO:38 and SEQ ID NO:39 was then compared with the performance of extended SEQ ID NO:40 and SEQ ID NO:41; the performance of SAMRS-containing SEQ ID NO:69 and SEQ ID NO:70 was then compared with the performance of SAMRS-containing extended SEQ ID NO:71 and SEQ ID NO:72. In single-plex PCR, the extended standard primers (SEQ ID NO:40 and SEQ ID NO:41) were more efficient than original standard primers SEQ ID NO:38 and SEQ ID NO:39 in PCR using TaqMan probe (Table 8, left) and in PCR with EvaGreen (Table 8, right). However, in the absence of target, SEQ ID NO:38 and SEQ ID NO:39 generated primer dimer in all duplicate experiments, while the extended primers SEQ ID NO:40 and SEQ ID NO:41 produced dimer in half of the duplicate experiments (Table 8, right).

In contrast, the SAMRS modification with lengthening rescued both standard RdRp-IP4 primers (SEQ ID NO:38, SEQ ID NO:39, SEQ ID NO:40, and SEQ ID NO:41, with or without extended sequences). The extended SAMRS primers (SEQ ID NO:71 and SEQ ID NO:72, RdRp-IP4_samrs*) gave faster and cleaner PCR than the standard primers, and produced no primer dimer in NTC (Table 8). Here was a useful advantage of SAMRS, but only with extended primers.

In some cases, the negative impact of SAMRS components was found to be mitigated by adding an external tag to the primer. This extension is not complementary to the coronaviral genes, but rather serves as a place where external primers can bind after PCR is initiated to "carry" the PCR. Thus, they can be any sequences. They may even incorporate components of an artificially expanded genetic information system (AEGIS) (FIG. 2).

Artificially expanded genetic information systems (AEGIS) are analogs of DNA and RNA (collectively xNA) that contain additional nucleotide pairs that recognize each other by an extended set of Watson-Crick complementarity rules. In standard DNA, the A: T and G: C fall two rules of complementarity: (a) size complementarity, where big purines pair with small pyrimidines, and (b) hydrogen bond complementarity, where hydrogen bond donors pair with hydrogen bond acceptors (FIG. 2). The added AEGIS still follow these two rules of Watson-Crick complementarity, but with rearranged hydrogen bond donor/acceptor groups. In principle, 12 building blocks form 6 orthogonal pairs are possible in AEGIS. The added eight nucleotide analogues forming four orthogonal pairs can complement nothing in natural biology, and therefore are highly orthogonal tags for tagged PCR.

Experimentation discovered that adding standard or AEGIS-containing tags to the primers allowed SAMRS-containing compositions of the instant invention to still better (Table 7). For example, in the N2 standard primers with tags (SEQ ID NO:75 and SEQ ID NO:76, Table 7, right) slow the tagged PCR by ~1.7 cycles than the N2 standard primers without tags (SEQ ID NO: 4 and SEQ ID NO:5, Table 7, left). In contrast, the N2 SAMRS primers with tags (SEQ ID NO: 96 and SEQ ID NO:97, Table 7, right) speeded PCR by ~5.8 cycles than N2 SAMRS primers without tag (SEQ ID NO:45 and SEQ ID NO:47, Table 7, left). This discovery was further demonstrated by the N4 standard and SAMRS primers with or without tag. The N4 standard primers with tag (SEQ ID NO:79 and SEQ ID NO:80, Table 7, right) slow the PCR by ~1.5 cycles than N4 standard primers without tag (SEQ ID NO:77 and SEQ ID NO:78, Table 7, left). In contrast, the N4 SAMRS primers with tags (SEQ ID NO: 100 and SEQ ID NO:101, Table 7, right) speeded PCR by ~3.7 cycles than N4 SAMRS primers without tag (SEQ ID NO: 98 and SEQ ID NO:99, Table 7, left).

In some cases, useful primers were obtained by introducing SAMRS components into sites that were speculated to problematically self-associate. For example, while not wishing to be bound by theory, analysis of the sequences of the primer/probe set of E gene from Charité suggested that the Charite E gene forward primer (SEQ ID NO:13, Table 1) might be susceptible to the formation of a self-dimer, and that the Charite reverse primer for the E gene (SEQ ID NO: 14, Table 1) can form dimers with primers targeting other genes (FIG. 3). We therefore explored various combinations of SAMR and standard nucleotides. This discovered that adding SAMRS components at specific sites to the forward and reverse primers of E gene (SEQ ID NO:52 and SEQ ID NO:53, Table 2) increased their performance. In several cases, this did not damage their singleplexed performance. For example, in singleplexed PCR, Charité E gene primers with one or two SAMRS components gave singleplexed PCR with approximately the same Ct (+0.3 cycles) as standard primers (Table 10). However, SAMRS primers gave stronger fluorescence intensity of the amplification curves than standard primers (FIG. 4). Further, at 100 copies of target per reaction, one third of the Charité standard primers produced primer dimer (Tm at ~74° C.) and artifacts (Tm at ~83° C.) in addition to the desired amplicon (Tm at 80° C., FIG. 4). SAMRS primers generated more desired products with amplicon Tm at ~79.6° C. (FIG. 4), as shown by EvaGreen dye fluorescence and melting curve analysis (FIG. 4).

TABLE 10

Modification of the Charité's standard primers with SAMRS components improve the performance of single-plex PCR targeting on E gene.
Comparing the performance of SAMRS primers to Charité's standard primers on E gene

| | Detection Method | | | |
|---|---|---|---|---|
| | TaqMan Probe (detected with Texas Red setting) | | EvaGreen (detected with FAM setting) | |
| BEI viral RNA copies/reaction | 1000 | 100 | 1000 | 100 |
| standard forward and standard reverse primers, SEQ ID NO: 13, SEQ ID NO: 14 | 30.3 | 33.7 | 29.4 | 33.2* |
| SAMRS forward and reverse primers, SEQ ID NO: 52, SEQ ID NO: 53 | 30.4 | 34.0 | 29.4 | 33.1 |

Each assay has 3 repeats.
*Standard primers form primer dimer (1 out 3 repeats) at low RNA concentrations (100 copies/assay).

These and other experiments are detailed in the examples. In many cases, SAMRS-containing primers have the same levels of efficiency as (Ct within +0.5 cycles) the corresponding "well designed" standard primers in single-plexed PCR. Specifically: for the N1, N3, and RNAseP genes, SAMRS primers with SEQ ID NO:43, SEQ ID NO:44, SEQ ID NO:48, SEQ ID NO:49, SEQ ID NO:50, and SEQ ID NO:51 (Table 2), have the same or slightly better sensitivity (10 copies/reaction, Table 11) than the standard primers with SEQ ID NO:1, SEQ ID NO:2, SEQ ID NO: 7, SEQ ID NO:8, SEQ ID NO:10, and SEQ ID NO:11 (Table 1).

TABLE 11

Results of comparing the performance of SAMRS primers to CDC standard primers in single-plex PCR targeting on N1, N2, N3, and RNAse P genes.

| Standard Primers or SAMRS Primers | Ct values of single-plex PCR | | | | |
|---|---|---|---|---|---|
| RNA Target Copies/reaction | 10000 | 1000 | 100 | 10 | NTC |
| N1 Std Primer SEQ ID NO: 1, SEQ ID NO: 2 | 26.9 | 30.7 | 33.6 | 36.1* | |
| N2 Std Primer SEQ ID NO: 4, SEQ ID NO: 5 | 27.7 | 31.2 | 34.6 | NA | |
| N3 Std Primer SEQ ID NO: 7, SEQ ID NO: 8 | 27.9 | 31.0 | 34.1 | NA | |
| RNAseP Std Primer SEQ ID NO: 10, SEQ ID NO: 11 | 24.5 | 24.6 | 24.6 | 24.9 | |
| N1 SAMRS Primer SEQ ID NO: 43, SEQ ID NO: 44 | 27.2 | 30.7 | 34.4 | 36.5* | |
| N2 SAMRS Primer SEQ ID NO: 46, SEQ ID NO: 5 | 27.8 | 31.6 | 35.2 | NA | |
| N3 SAMRS Primer SEQ ID NO: 48, SEQ ID NO: 49 | 27.5 | 30.6 | 33.6 | 36.9* | |
| RNAseP SAMRS SEQ ID NO: 50, SEQ ID NO: 51 | 23.8 | 24.0 | 23.9 | 24.2 | |

Std indicates standard. Two repeats for each assay.
*indicate 1/2 give signals.
NA = No Amplification. RNAse P target was 1000 copies per reaction for all assays.

In the Hong Kong primer and probe sets that target the RdRp/Hel gene, the SAMRS-containing primers (SEQ ID NO:63 and SEQ ID NO:64) and the standard primers (SEQ ID NO: 29 and SEQ ID NO:30) separately performed equally well in PCR with both the TaqMan readout and the EvaGreen readout in single-plex PCR.

(i) (5) (C) the Presently Preferred Compositions for Single-plexed PCR

These experiments delivered the presently preferred primers containing SAMRS that modified primers presented in the WHO collection. In summary:

To target the N1, N3, and RNAseP genes in a singleplexed format, SAMRS-containing primers with SEQ ID NO:43, SEQ ID NO:44, SEQ ID NO:48, SEQ ID NO:49, SEQ ID NO:50, and SEQ ID NO:51 are presently preferred. They have the approximately same levels of sensitivity (10 copies/assay) as their standard analogs, which are SEQ ID NO:1, SEQ ID NO:2, SEQ ID NO:7, SEQ ID NO:8, SEQ ID NO: 10, and SEQ ID NO:11, respectively.

To target the N2 gene in a singleplexed format, SAMRS primers with SEQ ID NO:46 and SEQ ID NO:5.

To target the E gene in a singleplexed format, the presently preferred SAMRS primers are SEQ ID NO:52 and SEQ ID NO:53.

To target the RdRP gene in a singleplexed format, the presently preferred SAMRS primers are SEQ ID NO:63 and SEQ ID NO:64, or SEQ ID NO:71 and SEQ ID NO:72.

(i) (6) Experiments were done to invent the compositions for multiplexed PCR

This and other work with singleplexed PCR with primers including SAMRS supported the next level of experimentation. Here, SAMRS-containing primers developed as inventive compositions that performed adequately (or better) in singleplexed PCR performed well in multiplexed PCR. This contrasted with the standard primers, which frequently failed to perform in a multiplexed assay, even if they successfully performed in a singleplexed assay.

For example, the ability of the SAMRS-containing primers combined to support quadruplex TaqMan PCR was compared to the corresponding standard primers. Both quadraplex PCR targeted on the N, E, RdRp, and RNAse P genes. The RT-PCR (20 µL) contained 5 µL of 4X master reaction mixture (TaqPath™ 1-Step RT-qPCR Master Mix), 0.5 µM of forward and reverse primers, 0.125 µM of probe, and 5 µL of RNA sample. RT-PCR reactions were conducted on a thermal cycler (Roche LightCycler® 96 or 480) with the following conditions: Reverse transcription at 53° C. for 10 min, inactivation of reverse transcriptase at 95° C. for 2 min, 45-50 cycles of PCR amplification (denaturing at 95° C. for 3 s; annealing/extending at 58 ° C. for 30 s). Fluorescence was detected in real time during each annealing-extension cycle. LightCycler 96 or 480 software was used to obtain a cycle threshold (Ct).

The first quadruplex PCR experiments shown that if the CDC primers (SEQ ID NO:1, SEQ ID NO: 2, SEQ ID NO:4, SEQ ID NO:5, SEQ ID NO:7, SEQ ID NO:8, SEQ ID NO: 10, SEQ ID NO: 11) for all four targets (N1, N2, N3, and RNAse P genes) without SAMRS were combined together in one PCR (Table 12). At low concentrations of target (10 copies/reaction), the N1 and N3 genes could not be amplified at all (Table 12). Further, the N2 target dropped out in half of the assays. However, the analogous primers containing SAMRS (SEQ ID NO:43, SEQ ID NO: 44, SEQ ID NO:46, SEQ ID NO:5, SEQ ID NO:48, SEQ ID NO:49, SEQ ID NO:50, SEQ ID NO: 51) could reliably amplify for detection the N1 and N3 targets; only the N2 gene experienced occasional dropout at these low target concentrations (Table 12).

TABLE 12

Results of comparing the performance of SAMRS primers to CDC standard primers in quadruplex PCR targeting on N1, N2, N3, and RNAse P genes.

| Standard Primers or SAMRS Primers RNA Target copies/reaction | Ct values of Quadruplex PCR | | | | |
|---|---|---|---|---|---|
| | 10000 | 1000 | 100 | 10 | NTC |
| N1 Std Primer SEQ ID NO: 1, SEQ ID NO: 2 | 28.1 | 31.2 | 34.8 | NA | |
| N2 Std Primer SEQ ID NO: 4, SEQ ID NO: 5 | 27.9 | 31.1 | 33.3 | 34.3* | |
| N3 Std Primer SEQ ID NO: 7, SEQ ID NO: 8 | 28.3 | 31.4 | 34.4 | NA | |
| RNAseP Std Primer SEQ ID NO: 10, SEQ ID NO: 11 | 21.6 | 24.6 | 28.4 | 31.6 | |
| N1 SAMRS Primer SEQ ID NO: 43, SEQ ID NO: 44 | 27.7 | 30.8 | 34.6 | 35.5 | |
| N2 SAMRS Primer SEQ ID NO: 46, SEQ ID NO: 5 | 27.9 | 31.4 | 33.6 | 34.4 | |
| N3 SAMRS Primer SEQ ID NO: 48, SEQ ID NO: 49 | 27.9 | 31.3 | 34.8 | 37.5* | |
| RNAseP SAMRS SEQ ID NO: 50, SEQ ID NO: 51 | 21.2 | 24.0 | 28.1 | 31.8 | |

NA = No Amplification.
*indicates 1/2 assay give signal.

At higher target concentrations (100 copies/reaction and above), the CDC primers for all four targets without SAMRS could detect all of the targets without drop-out (Table 12). However, the SAMRS primers produced faster (~0.3 cycles) amplification and higher amplification curves than the standard CDC primers in the multiplex (FIG. 5). While not wishing to be bound by theory, the improve performance may be due to SAMRS preventing the loss of amplification resources into unproductive modes.

The improvements created by SAMRS became increasingly manifest in another quadruplex PCR. For example, both standard primers (SEQ ID NO:1, SEQ ID NO:2, SEQ ID NO:40, SEQ ID NO: 41, SEQ ID NO: 13, SEQ ID NO: 14, SEQ ID NO: 10, SEQ ID NO: 11) and SAMRS primers (SEQ ID NO:43, SEQ ID NO:44, SEQ ID NO:71, SEQ ID NO:72, SEQ ID NO:52, SEQ ID NO: 53, SEQ ID NO:50, SEQ ID NO:51) of the N1, RdRp-IP4, E, and RNAseP show similar efficiency and sensitivity at higher target concentrations (over 100 copies/reaction, Table 13). However, at lower target concentrations (10 copies/reaction), all standard primers had over 60% dropouts, while SAMRS primers had only ~25% of dropouts (Table 13).

TABLE 13

Results of comparing the performance of SAMRS primers to standard primers (Ni, RdRp-IP4, E, and RNAse P) in quadruplex RT-PCR. Quadruplex PCR targeting on N, RdRp, E, and RNAse P genes

| BEI viral | Primer Types | | | | | | | |
|---|---|---|---|---|---|---|---|---|
| RNA copies/ | Standard primers | | | | SAMRS primers | | | |
| reaction | 1000 | 100 | 10 | NTC | 1000 | 100 | 10 | NTC |
| N1 target | 30.9 | 33.3 | NA | | 31.4 | 35.1 | 36.3 | |
| RdRp-IP4 target | 32.0 | 34.0 | NA | | 32.6 | 35.1 | 36.0* | |
| E target | 31.2 | 33.4 | 36.6* | | 32.1 | 35.8 | 36.8* | |
| RNAse P target | 28.5 | 28.3 | 27.8 | | 28.4 | 28.6 | 28.2 | |

*indicates 1 out of 2 repeats gave signal.
NTC = No Target Control.
NA = No Amplification.

Another example of a 4-plex PCR using SAMRS primers (SEQ ID NO:48, SEQ ID NO:49, SEQ ID NO:63, SEQ ID NO:64, SEQ ID NO:52, SEQ ID NO:53, SEQ ID NO:50, SEQ ID NO: 51) or standard primers (SEQ ID NO:8, SEQ ID NO:9, SEQ ID NO:29, SEQ ID NO:30, SEQ ID NO:13, SEQ ID NO:14, SEQ ID NO:10, SEQ ID NO:11) that targeted the N3, RdRp-Hel, E, and RNAse P genes (Table 14). The SAMRS primers reliably detected 40 copies of RNA target per PCR reaction (20 µl) without any dropouts. At 20 and 10 copies targets per PCR, SAMRS primers gave dropouts in 19% and 50% of the trials (3 out of 16 and 8 out of 16, respectively). In contrast, standard primers gave 19% of dropouts at 100 copies of target per PCR. At 40, 20, and 10 copies of target, the standard primers gave 31%, 44%, and 63% of dropouts in the trials, respectively (Table 14).

TABLE 14

Results of comparing the performance of SAMRS primers to standard primers (N3,
RdRp-Hel, E, and RNAse P) in quadruplex RT-PCR in Example 4.
Quadruplex PCR targeting on N3, RdRp-Hel, E, and RNAse P genes

| BEI viral RNA copies/ reaction | Primer Types | | | | | | | | | | | |
|---|---|---|---|---|---|---|---|---|---|---|---|---|
| | Standard primers | | | | | | SAMRS primers | | | | | |
| | 400 | 200 | 100 | 40 | 20 | 10 | 400 | 200 | 100 | 40 | 20 | 10 |
| N3 target | 30 | 30.9 | 32.7*** | 33.9 ** | 34.7** | 34.3* | 29.7 | 30 | 31.4 | 33.8 | 33.6 | 34.6** |
| RdRp-Hel target | 34.3 | 34.7 | 35.5*** | 37.1 ** | 37.3 * | NA | 34.3 | 35.1 | 36 | 37.5 | 38.4 ** | NA |
| E target | 32.9 | 33.6 | 35.4*** | 36.7*** | 37.4** | 37.0* | 32.9 | 33.8 | 34.6 | 36.6 | 36.5*** | 37.8** |
| RNAse P target | 27.5 | 28.5 | 29.3 | 31.2 | 32 | 33.4 | 26.1 | 28.2 | 29 | 30.3 | 31.4 | 32.4 |

*** indicate 3 out of 4 repeats give signals,
** indicate 2/4 give signals and
* indicate 1/4 give signals.
NA = No Amplification.

Further, the same SAMRS primers generated faster amplification (by ~0.3 cycles) and higher amplification curves than standard primers in this quadruplex PCR, indicating less wastage of amplification resources. The sensitivities of these SAMRS primers over standard primers are more pronounced at lower target concentrations (less 200 copies/assay). Linear regression was performed to obtain an averaged slope of −3.32±0.29, with $R2=0.97±0.02$ for SAMRS primers, compared to a slope of −3.05±0.47 and $R2=0.94±0.05$ for standard primers (FIG. 6a and FIG. 6b). The PCR amplification using SAMRS primers is close to perfect doubling per PCR cycle, and the R2 is higher than the R2 of standard primers. These represent useful improvements across all of the panels.

This improvement was surprisingly robust even at 10-plex PCR. For example, an assay that detects CoV19 would have special utility if it were also able to detect other coronaviruses, such as the coronavirus that caused the Middle East respiratory syndrome (MERS) and the coronavirus that cause the 2003 outbreak of SARS. Accordingly, three sets of the MERS-specific primers (SEQ ID NO:82, SEQ ID NO:83, SEQ ID NO:84, SEQ ID NO:85, SEQ ID NO:86, SEQ ID NO: 87 for MERS, Table 3) and three sets of the SARS-specific primers (SEQ ID NO:88, SEQ ID NO:89, SEQ ID NO:90, SEQ ID NO:91, SEQ ID NO:92, SEQ ID NO:93 for SARS, Table 3) were added to the presently most preferred quadruplex PCR. When six sets of the standard primers were added, the multiplex PCR with standard primers collapsed (Table 15). However, when the SAMRS modified primers SAMRS (SEQ ID NO:117, SEQ ID NO:118, SEQ ID NO:119, SEQ ID NO: 120, SEQ ID NO: 121, SEQ ID NO: 122 for MERS, SEQ ID NO: 123, SEQ ID NO: 124, SEQ ID NO: 125, SEQ ID NO: 126, SEQ ID NO: 127, SEQ ID NO: 128 for SARS, Table 4) were added, the multiplex PCR with SAMRS primers succeeded (Table 15).

At 10-plex multiplex RT-PCR, the presence of additional six pairs of standard primers killed the PCR to detect CoV19 when using the UltraPlex 1-Step ToughMix (Quanta Bio). 10x-PCR with standard primers failed to detect 2500 copies of RNA for all three targets (N1, RdRp-Hel, and E genes). In contrast, 10x-PCR with SAMRS primers can successfully detect 500 copies of RNA for all four targets. At lower target concentrations, 100 copies of RNA, 10x-PCR with SAMRS primers can still detect all target, although with some dropouts (Table 15).

When the UltraPlex 1-Step ToughMix (Quanta Bio) was replaced by the One Step PrimeScript™ III Enzyme Mix (Takara Bio), the advantage of SAMRS primers to empower a flexible multiplex PCR is further demonstrated.

TABLE 15

Results of comparison of the performance of SAMRS primers to standard primers in
10-plex RT-PCR that includes primer pairs selected independently that target MERS and SARS.
Comparison of the performance of SAMRS primers to standard primers in 10-plex RT-PCR

| BEI viral RNA copies/ reaction | Enzyme type UltraPlex 1-Step ToughMix Primer Type | | | | | | | |
|---|---|---|---|---|---|---|---|---|
| | 10-plex standard primers | | | | 10-plex SAMRS primers | | | |
| | 2500 | 500 | 100 | NTC | 2500 | 500 | 100 | NTC |
| N1 target | 28.8 | 28.9 | 29.1 | 29 | 32 | 33.5 | 34.6 | |
| RdRp-Hel target | NA | NA | NA | | 30.9 | 31.7 | 31.8* | |
| E target | NA | NA | NA | | 31.3 | 32.1 | 32.5* | |
| RNAseP target | 27.2 | 28.3 | NA | | 29.6 | 31.1 | 32.7 | |

Each target concentration has 4 repeats.
*indicate 1/4 gave signal.
NA = No Amplification.

(i) (7) The performance of these compositions were robust with respect to different presentations of the CoV19 target, different enzymes, and different processes The coronavirus targets can be presented to an assay either as DNA, or as RNA, with the RNA being generated either synthetically or derived from a natural virus. The performance of the compositions of the instant invention was robust with respect to alternative choices of target presentation. The analytical sensitivity of SAMRS-containing primers in quadruplex TaqMan RT-PCR was robust when with BEI viral RNA was used as targets. Further, the performance worked with enzymes from different vendors (Table 5).

For example, the TaqPath™ 1-Step RT-qPCR Master Mix can be replaced by the 4x enzyme mixture of the Quantabio UltraPlex™ 1-Step ToughMix® (Quantabio, 95166-01K), SuperScript™ III Platinum™ One-Step qRT-PCR Kit (ThermoFisher, 11732088), One Step PrimeScript™ III RT-PCR Kit (Takara Bio, RR600B), Luna® Universal Probe One-Step RT-qPCR Kit (NEB, E3006X), and enzymes from other vendors (Table 5). Various of primer concentrations from 1.0 µM to 0.1 µM and probe concentrations from 0.05 µM to 0.3 µM were also evaluated. In General, SAMRS primers have higher sensitivity and produce higher amplification signals than the standard primers with various of enzymes from different vendors.

The presently preferred SAMRS-containing primers combined in a 4-plexed PCR targets the N1, E, RdRp-Hel Hong Kong, and RNAse P genes, and comprises SEQ ID NO:43, SEQ ID NO: 44, SEQ ID NO:52, SEQ ID NO:53, SEQ ID NO:63, SEQ ID NO:64, SEQ ID NO:50, SEQ ID NO: 51. Experimental data shown that UltraPlex 1-Step ToughMix (Quanta Bio) are presently preferred for their sensitivity and efficiency over TaqPath™ 1-Step RT-qPCR Master Mix (ThermoFisher). At 10 copies of BEI viral RNA per reaction, only 1 out of 12 assay has dropout for the UltaPlex Tough-Mix, while, 5 out of 12 assays have dropouts for the TaqPath master mix. Over all, the PCR efficiency of the UltaPlex ToughMix is ~ 1 cycle faster than the TaqPath master mix.

As further experimental data shown in Table 16, One Step PrimeScript™ III Enzyme Mix (Takara Bio) offers higher sensitivity than the UltraPlex 1-Step ToughMix (Quanta Bio). At 10 copies of BEI viral RNA per reaction, all 12 assays (no dropout) successfully give signals without dropout for the PrimeScript™ III Enzyme Mix, while, 1 out of 12 assays have dropouts for the UltraPlex 1-Step ToughMix Enzyme Mix. However, UltraPlex 1-Step ToughMix has higher PCR efficiency (~1.5 cycles faster, Table 16).

TABLE 16

Results of evaluating the performance of SAMRS modified quadruplex RT-qPCR (N1, RdRp-Hel, E, and RNAse P) using Enzymes from different vendors.

SAMRS modified Quadruplex RT-qPCR using Enzyme Mix from different vendors

| BEI viral RNA | Enzyme Types | | | | | | | | | |
|---|---|---|---|---|---|---|---|---|---|---|
| | One Step PrimeScript Enzyme Mix | | | | | UltraPlex ToughMix Enzyme Mix | | | | |
| copies/reaction | 10000 | 1000 | 100 | 10 | NTC | 10000 | 1000 | 100 | 10 | NTC |
| N1 target | 28.5 | 31.1 | 34.4 | 38.5 | | 27.1 | 30.3 | 33.5 | 37.1 | |
| RdRp-Hel target | 29.9 | 32.4 | 36.5 | 38.4 | | 27.3 | 30.6 | 33.5 | 35.3*** | |
| E target | 28.7 | 31.8 | 34.8 | 37.8 | | 27.5 | 30.7 | 33.9 | 36.6 | |
| RNAse P | 29.2 | 30.4 | 34.0 | 37.5 | | 26.9 | 29.6 | 33.0 | 36.1 | |

Four repeats for each assay.

*** indicates 3/4 give signals.

Over all, the One Step PrimeScript™ III Enzyme Mix (Takara Bio) is the presently preferred enzyme among all the enzymes tested. The analytical sensitive is below ~10 copies of BEI viral RNA per reaction with One Step PrimeScript™ III Enzyme Mix.

(i) (8) The performance of these compositions were robust with respect to the CoV19 target in different media.

As is shown in Table 17, the assay was also robust in detecting CoV19 targets when presented directly from viral transport media (VTM) without RNA extraction and purification. Here, BEI viral RNA samples were spiked into Corning™ Transport Medium (VTM, Fisher Scientific, MT25500CV), then, the BEI RNA with VTM was directly added into RT-PCR. The performances of the RT-PCR with SAMRS modified primers were compared to the standard primers.

TABLE 17

Results of evaluating the performance of Standard and SAMRS primers in quadruplex RT-qPCR using BEI viral RNA in VTM.

| BEI viral RNA in VTM | Enzyme type Quantabio UltraPlex EnzymeMix Primer Type | | | | | | | |
|---|---|---|---|---|---|---|---|---|
| | Standard primers | | | | SAMRS primers | | | |
| copies/ reaction | 320 | 80 | 20 | NTC | 320 | 80 | 20 | NTC |
| N1 target | 31.4 | 31.3*** | 32.2*** | | 33.3 | 34.4 | 35.6*** | |
| RdRp-Hel target | NA | NA | NA | | 32.6 | 32.7** | 33.9** | |
| E target | NA | NA | NA | | 33.4 | 33.5** | 35.4** | |
| RNAseP target | NA | NA | NA | | 34.3 | 34.8*** | NA | |

Each target concentration has 4 repeats.
**indicate 2/4 gave signal.
***indicate 3/4 gave signals.
NA = No Amplification.

The presence of VTM inhibited RT-PCR when using the UltraPlex 1-Step ToughMix (Quanta Bio). PCR with standard primers failed to detect 320 copies of RNA with VTM for RdRp-Hel, E, and RNAseP targets. In contrast, PCR with SAMRS primers can successfully detect 320 copies of RNA with VTM for all four targets. At lower target concentrations, 80 and 20 copies of RNA with VTM per reaction, the dropout rates were 5 out of 16 assays (31%) and 9 out of 16 assays (56%), respectively (Table 17).

When the UltraPlex 1-Step ToughMix (Quanta Bio) was replaced by the One Step PrimeScript™ III Enzyme Mix (Takara Bio), the presence of VTM still inhibit the RT-PCR as the results shown in Table 17. However, the Takara PrimeScript™ III enzyme has higher tolerance of VTM than the Quanta Bio UltraPlex enzyme mix.

(i) (9) The performance of these compositions was further improved by adding an AEGIS tag to the 5' of SAMRS primers.

When add an AEGIS tag to the 5' of the SAMRS primers. The performance of the AEGIS-SAMRS primers (SEQ ID NO:102, SEQ ID NO:103, SEQ ID NO:115, SEQ ID NO:116, SEQ ID NO: 111, SEQ ID NO:112, SEQ ID NO: 109, SEQ ID NO: 110, Table 4) were compared to SAMRS primers (SEQ ID NO:43, SEQ ID NO:44, SEQ ID NO:71, SEQ ID NO:72, SEQ ID NO: 52, SEQ ID NO:53, SEQ ID NO:50, SEQ ID NO:51, Table 2) in a quadruplex PCR targeting on N1, RdRp-IP4, E, and RNAse P genes.

For a quadruplex TaqMan RT-PCR (Table 18), the RT-PCR assay (20 μL) contained 5 μL of 4X master reaction mixture (TaqPath™ 1-Step RT-qPCR Master Mix), 0.5 μM of SAMRS modified forward and reverse primers, 0.125 μM of probe, and 5 μL of RNA sample. For the AEGIS-tagged SAMRS primers, dZTP (0.05 mM final) need to be included into the PCR. RT-PCR reactions were conducted on a thermal cycler (Roche LightCycler® 480) with the following conditions: Reverse transcription at 53° C. for 10 min, inactivation of reverse transcriptase at 95° C. for 2 min, 50 cycles of PCR amplification (Denaturing at 95° C. for 5 s; Annealing/Extending at 58° C. for 30 s). Fluorescence was detected in real time during each annealing-extension cycle. LightCycler 480 software was used to obtain a cycle threshold (Ct).

TABLE 18

Results of comparison of the performance of SAMRS primers to AEGIS-SAMRS primers in 4-plex RT-PCR.
Ct values of SAMRS primers vs AEGIS-SAMRS primers in quadruplex PCR

| RNA Target | Primer Types | | | | | | | |
|---|---|---|---|---|---|---|---|---|
| copies/ | SAMRS Primers | | | | SAMRS Primers with AEGIS tag | | | |
| reaction | 400 | 100 | 40 | 10 | 400 | 100 | 40 | 10 |
| N1 target | 34.3 | 36.6 | 37.1** | 37.6* | 34.6 | 35.3 | 37.2** | 37.9* |
| RdRp-IP4 target | 35.5 | 37.0 | 37.0* | NA | 36.0 | 36.6 | 37.4** | 38.7* |
| E target | 35.0 | 37.9 | NA | NA | 36.7 | 38.3 | 39.4** | NA |
| RNAseP target | 29.2 | 31.3 | 32.5 | 34.5 | 29.8 | 31.7 | 32.9 | 34.7 |

Three repeats for each RNA concentration.
*indicate one out of three give signal.
**indicate two out of three give signal.
NA indicate No Amplification.

As the results shown in Table 18, the assay was robust in tagged PCR carried by AEGIS-containing external primers. The performance of the AEGIS-SAMRS primers were compared to untagged SAMRS primers in a quadruplex PCR (Table 18). As shown in Table 18, the AEGIS tagged SAMRS primers (AEGIS-SAMRS primers) gave higher sensitivity than the SAMRS primers without AEGIS tag.

To expand the assay to influenza, RSV, or other RNA targets, which may be, without limitations, viral and non-viral targets and control targets, pairs of primers containing SAMRS may be added to any of the multiplexes described herein. The presently preferred primers for influenza A and influenza B are shown in Table 19.

TABLE 19

Presently preferred SAMRS-containing primers to be included in coronavirus-targeted multiplexes that target influenza and RSV, as pathogens that give symptoms that can be confused with coronavirus symptoms. Y = C + T, V = G + A + C

| Oligo Name | SEQ ID | SEQUENCE (5'-3') |
|---|---|---|
| 1-InfA-F1_a | SEQ ID NO: 129 | CAA GAC CAA TCY TGT CAC CTC TGa C |
| 2-InfA-F2_a | SEQ ID NO: 130 | CAA GAC CAA TYC TGT CAC CTY TGa C |
| 3-InfA-R1-V_a | SEQ ID NO: 131 | GCA TTY TGG ACA AAV CGT CTa CG |
| 4-InfA-R1-I_a | SEQ ID NO: 132 | GCA TTY TGG ACA AAg CGT CTa CG |
| 5-InfA-R2-G_a | SEQ ID NO: 133 | GCA TTT TGG AYA AAG CGT CTa CG |
| 6-InfB-F_c | SEQ ID NO: 134 | TCC TCA AYT CAC TCT TCG AGc G |
| 7-InfB-R_g | SEQ ID NO: 135 | CGG TGC TCT TGA CCA AAT Tg G |
| 8-RSV-A-F_c | SEQ ID NO: 136 | CGT CTT AAT GTA GCA GAA TTc AC |
| 9-RSV-A-R_a | SEQ ID NO: 137 | ATC AAT CCC ATT CTA ACA AGa TC |
| 10-RSV-B-F_a | SEQ ID NO: 138 | GGA AAC ATA CGT GAA CAa GC |
| 11-RSV-B-R_ga | SEQ ID NO: 139 | GAT GAC TGG AAC ATA GgC aC |
| 1-InfA-F1_a | SEQ ID NO: 140 | P CAA GAC CAA TCY TGT CAC CTC TGa C |
| 2-InfA-F2_a | SEQ ID NO: 141 | P CAA GAC CAA TYC TGT CAC CTY TGa C |
| 3-InfA-R1-V_a | SEQ ID NO: 142 | P GCA TTY TGG ACA AAV CGT CTa CG |
| 4-InfA-R1-I_a | SEQ ID NO: 143 | P GCA TTY TGG ACA AAg CGT CTa CG |
| 5-InfA-R2-G_a | SEQ ID NO: 144 | P GCA TTT TGG AYA AAG CGT CTa CG |
| 6-InfB-F_c | SEQ ID NO: 145 | P TCC TCA AYT CAC TCT TCG AGc G |

TABLE 19-continued

Presently preferred SAMRS-containing primers to be included in coronavirus-targeted multiplexes that target influenza and RSV, as pathogens that give symptoms that can be confused with coronavirus symptoms. Y = C + T, V = G + A + C

| Oligo Name | SEQ ID | SEQUENCE (5'-3') |
|---|---|---|
| 7-InfB-R_g | SEQ ID NO: 146 | P CGG TGC TCT TGA CCA AAT Tg G |
| 8-RSV-A-F_c | SEQ ID NO: 147 | P CGT CTT AAT GTA GCA GAA TTc AC |
| 9-RSV-A-R_a | SEQ ID NO: 148 | P ATC AAT CCC ATT CTA ACA AGa TC |
| 10-RSV-B-F_a | SEQ ID NO: 149 | P GGA AAC ATA CGT GAA CAa GC |
| 11-RSV-B-R_ga | SEQ ID NO: 150 | P GAT GAC TGG AAC ATA GgC aC |

REFERENCES

1 R. K. Saiki, D. H. Gelfand, S. Stoffel, S. J. Scharf, R. Higuchi, G. T. Horn, K. B. Mullis, H. A. Erlich (1988) Primer-directed enzymatic amplification of DNA with a thermostable DNA polymerase. *Science* 239, 487-491]

2 Hoshika, S., Leal, N., Chen, F., Benner, S. A. (2010) Artificial genetic systems. Self-avoiding DNA in PCR and multiplexed PCR. *Angew. Chem. Int. Edit.* 49, 5554-5557

3 Yang, Z., Le, J. T., Hutter, D., Bradley, K. M., Overton, B., Mclendon, D. C., Benner, S. A. (2020) Eliminating primer dimers and improving SNP detection using self-avoiding molecular recognition systems (SAMRS) *Biology Methods & Protocols* 5 (1), bpaa004. doi: 10.1093/biomethods/bpaa004

4 Glushakova, L. G., Bradley, A., Bradley. K. M., Alto, B. W., Hoshika, S., Hutter, D., Sharma, N., Yang, Benner, S. A. (2015) High-throughput multiplexed xMAP Luminex array panel for detection of twenty two medically important mosquito-borne arboviruses based on innovations in synthetic biology. *J. Virol. Meth.* 214, 60-74. PMC4485418. doi: 10.1016/j.jviromet.2015.01.003

5 Gorbalenya, A. E., Baker, S. C., Baric, R. S., de Groot, R. J., Drosten, C., Gulyaeva, A. A., Haagmans, B. L., Lauber, C., Leontovich, A. M., Neuman, B. W. et al. (2020) The species severe acute respiratory syndrome-related coronavirus: Classifying 2019-nCOV and naming it SARS-COV-2. *Nature Microbiology,* 5, 536-544

6 Wu, F., Zhao, S., Yu, B., Chen, Y. M., Wang, W., Song, Z. G., Hu, Y., Tao, Z. W., Tian, J. H., Pei, Y. Y. et al. (2020) A new coronavirus associated with human respiratory disease in China. *Nature,* 579, 265-+.

7 Lu, R., Zhao, X., Li, J., Niu, P., Yang, B., Wu, H., Wang, W., Song, H., Huang, B., Zhu, N. et al. (2020) Genomic characterisation and epidemiology of 2019 novel coronavirus: implications for virus origins and receptor binding. *The Lancet,* 395, 565-574.

8 Khan, K. A. and Cheung, P. (2020) Presence of mismatches between diagnostic PCR assays and coronavirus SARS-COV-2 genome. *Royal Society Open Science,* 7.

9 Nalla, A. K., Casto, A. M., Huang, M.-L. W., Perchetti, G. A., Sampoleo, R., Shrestha, L., Wei, Y., Zhu, H., Jerome, K. R. and Greninger, A. L. (2020) Comparative Performance of SARS-CoV-2 Detection Assays Using Seven Different Primer-Probe Sets and One Assay Kit. *J. Clin. Microbiol.* 58 (6)

10 Muenchhoff, M., Mairhofer, H., Nitschko, H., Grzimek-Koschewa, N., Hoffmann, D., Berger, A., Rabenau, H., Widera, M., Ackermann, N., Konrad, R. et al. (2020) Multicentre comparison of quantitative PCR-based assays to detect SARS-COV-2, Germany, March 2020. *Euro Surveill,* 25.

What is claimed is:

1. A composition of matter that comprises the DNA molecules whose sequences comprise, at their 3'-ends, SEQ ID NO:43, SEQ ID NO:44, SEQ ID NO:45, SEQ ID NO: 46, SEQ ID NO: 47, SEQ ID NO:48, SEQ ID NO:49, SEQ ID NO:50, and SEQ ID NO: 51.

2. A composition of matter that comprises DNA molecules whose sequences comprise, at their 3'-ends SEQ ID NO:43, SEQ ID NO:44, SEQ ID NO:71, SEQ ID NO: 72, SEQ ID NO:52, SEQ ID NO:53, SEQ ID NO:50 and SEQ ID NO:51.

3. A composition of matter that comprises DNA molecules whose sequences comprise, at their 3'-ends, SEQ ID NO:48, SEQ ID NO:49, SEQ ID NO:63, SEQ ID NO: 64, SEQ ID NO:52, SEQ ID NO:53, SEQ ID NO:50, and SEQ ID NO:51.

4. A composition of matter that comprises DNA molecules whose sequences comprise, at their 3'-ends, SEQ ID NO:43, SEQ ID NO:44, SEQ ID NO: 63, SEQ ID NO:64, SEQ ID NO:52, SEQ ID NO:53, SEQ ID NO:50 and SEQ ID NO:51.

5. The composition of claim 4, to which are added one or more pairs of DNA molecules whose sequences comprise, at their 3'-ends, SEQ ID NO:117 and SEQ ID NO: 118 in a pair, SEQ ID NO:119 and SEQ ID NO: 120 in a pair, SEQ ID NO: 121 and SEQ ID NO: 122 in a pair, SEQ ID NO: 123 and SEQ ID NO: 124 in a pair, SEQ ID NO: 125 and SEQ ID NO: 126 in a pair, SEQ ID NO:127 and SEQ ID NO:128 in a pair.

6. The composition of claim 1, 2, 3, 4, or 5, to which tags are added to the DNA molecules therein, where said tags comprise nucleotides independently selected from the group consisting of S, B, Z, P, V, J, K and X.

7. The composition of claim 6, wherein said DNA molecules comprise one or more of SEQ ID NO:94, SEQ ID NO:95, SEQ ID NO:96, SEQ ID NO:95, SEQ ID NO: 102, SEQ ID NO:103, SEQ ID NO: 104, SEQ ID NO: 106, SEQ ID NO: 107, SEQ ID NO: 108, SEQ ID NO: 109, SEQ ID NO: 110, SEQ ID NO: 111, SEQ ID NO: 112, SEQ ID NO: 113, SEQ ID NO: 114, SEQ ID NO: 115, SEQ ID NO: 116, SEQ ID NO: 117, SEQ ID NO: 118, SEQ ID NO: 119, SEQ ID NO: 120, SEQ ID NO:121, SEQ ID NO: 122, SEQ ID NO: 123, SEQ ID NO: 124, SEQ ID NO: 125, SEQ ID NO: 126, SEQ ID NO: 127, SEQ ID NO: 128.

8. A process for detecting an RNA target in a mixture, wherein said process comprises performing a polymerase chain reaction, wherein the primers in said polymerase chain reaction comprise any of sequences identified by sequence identification numbers SEQ ID NO:43, SEQ ID NO:44, SEQ ID NO:45, SEQ ID NO:46, SEQ ID NO: 47, SEQ ID NO:48, SEQ ID NO:49, SEQ ID NO:50, SEQ ID NO:51, SEQ ID NO:52, SEQ ID NO:53, SEQ ID NO:63, SEQ ID NO:64, SEQ ID NO:71, SEQ ID NO:72, SEQ ID NO: 94, SEQ ID NO: 95, SEQ ID NO:96, SEQ ID NO: 102, SEQ ID NO:103, SEQ ID NO: 104, SEQ ID NO: 106, SEQ ID NO: 107, SEQ ID NO: 108, SEQ ID NO: 109, SEQ ID NO: 110, SEQ ID NO: 111, SEQ ID NO: 112, SEQ ID NO: 113, SEQ ID NO: 114, SEQ ID NO: 115, SEQ ID NO: 116, SEQ ID NO: 117, SEQ ID NO: 118, SEQ ID NO: 119, SEQ ID NO: 120, SEQ ID NO: 121, SEQ ID NO: 122, SEQ ID NO: 123, SEQ ID NO: 124, SEQ ID NO: 125, SEQ ID NO: 126, SEQ ID NO: 127, or SEQ ID NO: 128.

9. The process of claim 8, wherein said mixture comprises a viral transport medium.

10. The process of claim 8, wherein said mixture comprises saliva swabs, environmental swabs, and/or raw nasal swabs.

* * * * *